United States Patent
Fracastoro et al.

(10) Patent No.: US 11,122,298 B2
(45) Date of Patent: Sep. 14, 2021

(54) TECHNIQUES FOR ENCODING AND DECODING DIGITAL DATA USING GRAPH-BASED TRANSFORMATIONS

(71) Applicants: SISVEL TECHNOLOGY S.R.L., None (IT); ECOLE POLYTECHNIQUE FEDERALE DE LAUSANNE (EPFL), Lausanne (CH)

(72) Inventors: Giulia Fracastoro, Turin (IT); Dorina Thanou, Lausanne (CH); Pascal Frossard, La Tour-de-Treme (CH)

(73) Assignees: Sisvel Technology S.R.L., None (IT); Ecole Polytechnique Federale De Lausanne (EPFL), Lausanne (CH)

( * ) Notice: Subject to any disclaimer, the term of this patent is extended or adjusted under 35 U.S.C. 154(b) by 0 days.

(21) Appl. No.: 16/465,926

(22) PCT Filed: Nov. 29, 2017

(86) PCT No.: PCT/IB2017/057487
§ 371 (c)(1),
(2) Date: May 31, 2019

(87) PCT Pub. No.: WO2018/100503
PCT Pub. Date: Jun. 7, 2018

(65) Prior Publication Data
US 2020/0228840 A1    Jul. 16, 2020

(30) Foreign Application Priority Data
Dec. 2, 2016  (IT) .......................... 102016000122898

(51) Int. Cl.
*H04N 19/625*   (2014.01)
*H04N 19/122*   (2014.01)
(Continued)

(52) U.S. Cl.
CPC .......... *H04N 19/625* (2014.11); *G06K 9/522* (2013.01); *H04N 19/122* (2014.11); *H04N 19/17* (2014.11)

(58) Field of Classification Search
None
See application file for complete search history.

(56) References Cited

U.S. PATENT DOCUMENTS 10,382,711 B2 *   8/2019   Said ......................... G06K 9/36
10,412,415 B2 *   9/2019   Said ....................... H04N 19/14
(Continued)

FOREIGN PATENT DOCUMENTS

WO        2017/046750 A1      3/2017

OTHER PUBLICATIONS

International Search Report and Written Opinion dated Apr. 24, 2018, issued in PCT Application No. PCT/IB2017/057487, filed Nov. 29, 2017.

(Continued)

*Primary Examiner* — Stefan Gadomski
(74) *Attorney, Agent, or Firm* — Workman Nydegger

(57) ABSTRACT

A method and an apparatus for encoding and/or decoding digital images, wherein the encoding apparatus includes a processor configured for determining weights of a graph related to an image by minimizing a cost function, transforming the weights through a graph Fourier transform, quantizing the transformed weights, computing transformed coefficients through a graph Fourier transform of a graph having the transformed weights as weights, de-quantizing the quantized transformed weights, computing a reconstructed image through an inverse graph Fourier transform on the basis of the de-quantized transformed weights, computing a distortion cost on the basis of the reconstructed (Continued)

image and the original image, generating a final encoded image on the basis of the distortion cost.

18 Claims, 16 Drawing Sheets

(51) Int. Cl.
*H04N 19/17* (2014.01)
*G06K 9/52* (2006.01)

(56) References Cited

U.S. PATENT DOCUMENTS

| | | | | |
|---|---|---|---|---|
| 10,425,649 | B2* | 9/2019 | Said | H04N 19/105 |
| 10,469,838 | B2* | 11/2019 | Lee | H04N 19/122 |
| 2007/0008337 | A1* | 1/2007 | White | G06T 11/206 |
| | | | | 345/629 |
| 2011/0206288 | A1* | 8/2011 | Lee | H04N 19/182 |
| | | | | 382/233 |
| 2011/0221769 | A1* | 9/2011 | Leung | G06K 9/469 |
| | | | | 345/633 |
| 2013/0272422 | A1* | 10/2013 | Lee | H04N 19/122 |
| | | | | 375/240.18 |
| 2014/0192046 | A1* | 7/2014 | Paragios | G06T 15/005 |
| | | | | 345/419 |
| 2015/0112897 | A1* | 4/2015 | Wang | G06K 9/469 |
| | | | | 706/12 |
| 2015/0317808 | A1* | 11/2015 | Tian | G06T 11/206 |
| | | | | 345/440 |
| 2017/0134760 | A1* | 5/2017 | Kirchhoffer | H04N 19/46 |
| 2017/0155913 | A1* | 6/2017 | McCarthy | H04N 19/14 |
| 2017/0257579 | A1* | 9/2017 | Said | G06T 9/008 |
| 2017/0318311 | A1* | 11/2017 | Said | H04N 19/107 |
| 2017/0339422 | A1* | 11/2017 | Said | H04N 19/117 |
| 2017/0359581 | A1* | 12/2017 | Rusanovskyy | H04N 19/18 |
| 2017/0359584 | A1* | 12/2017 | Said | H04N 19/19 |
| 2018/0041760 | A1* | 2/2018 | Koo | H04N 19/122 |
| 2018/0146195 | A1* | 5/2018 | Koo | H04N 19/625 |
| 2018/0167618 | A1* | 6/2018 | Lee | H04N 19/14 |
| 2018/0213233 | A1* | 7/2018 | Koo | H04N 19/14 |
| 2018/0220158 | A1* | 8/2018 | Koo | H04N 19/159 |
| 2018/0288407 | A1* | 10/2018 | Lee | H04N 19/122 |
| 2018/0288411 | A1* | 10/2018 | Egilmez | H04N 19/61 |
| 2018/0288438 | A1* | 10/2018 | Chao | H04N 19/12 |

OTHER PUBLICATIONS

G. Bjontegaard, *Calculation of Average PSNR Differences Between RD Curves*, Doc. VCEG-M33 ITU-T Q6/16, Austin, TX, USA, Apr. 2-4, 2001, pp. 5.

X. Dong, et al., *Learning Laplacian Matrix in Smooth Graph Signal Representations*, published in arXiv preprint arXiv:1406.7842 (2014), pp. 14.

W. Hu, et al., *Multiresolution Graph Fourier Transform for Compression of Piecewise Smooth Images*, IEEE Transactions on Image Processing, vol. 24, No. 1, Jan. 2015, pp. 419-433.

Kim, et al., *Graph Based Transforms for Depth Video Coding*, published in ICASSP 2012 proceedings, pp. 813-816.

Narang, et al., *Critically Sampled Graph-Based Wavelet Transforms for Image Coding*, published in APSIPA 2013 proceedings, pp. 4.

E. Pavez et al., *Generalized Laplacian Precision Matrix Estimation for Graph Signal Processing*, published in IEEE International Conference on Acoustics Speech and Signal Processing (ICASSP2016), Mar. 2016, pp. 6.

E. Pavez, et al., *GTT: Graph Template Transforms with Applications to Image Coding*, published in Picture Coding Symposium (PCS2015), Jul. 2015, pp. 6.

I. Rotondo, et al., *Designing Sparse Graphs via Structure Tensor for Block Transform Coding of Images*, Proceedings of APSIPA Annual Summit and Conference 2015, Dec. 16-19, 2015, pp. 571-574.

D.I. Shuman, et al., *The Emerging Field of Signal Processing on Graphs: Extending High-Dimensional Data Analysis to Networks and Other Irregular Domains*, Signal Processing Magazine, IEEE, vol. 30, No. 3, Mar. 10, 2013, pp. 83-98.

Sandryhaila et al. in *Nearest-Neighbor Image Model*, published in ICIP 2012 proceedings, pp. 4.

K. Sayood, *Introduction to Data Compression*, Third Edition, Newnes, 2012, pp. 703.

G. Shen, et al., *Edge Adaptive Transforms for Efficient Depth Map Coding*, published in Picture Coding Symposium 2010, pp. 4.

G. Taubin, *A Signal Processing Approach to Fair Surface Design*, Proceedings of the 22$^{nd}$ Annual Conference on Computer Graphics and Interactive Techniques, ACM, 1995, pp. 351-358.

* cited by examiner (a)

(b)

(a)

(b)

(a)

(b)

(a)

(b)

(a)

(b)

(c)

(a)

(b)

TECHNIQUES FOR ENCODING AND DECODING DIGITAL DATA USING GRAPH-BASED TRANSFORMATIONS

BACKGROUND OF THE INVENTION

Field of the Invention

The present invention relates to a method and an apparatus for encoding and/or decoding digital images; in particular, for coding and/or decoding digital images by means of the so-called graph-based transformations.

Description of Prior Art

The Discrete Cosine Transform (DCT) is the most common transform used for block-based image and video compression (see K. Sayood, *Introduction to data compression*, Newnes, 2012); indeed, the DCT is at the basis of popular video coding standards such as MPEG-2 (used, for example, for terrestrial and satellite standard definition video broadcasting and in the DVD storage format), H.264/AVC (used for high-definition video broadcasting, streaming over IP networks and in Blu-Ray discs) and in the recently standardized H.265/HEVC (expected to replace H.264/AVC in the above-mentioned scenarios).

One of the main drawbacks of the DCT is that when a block contains discontinuities, the resulting transform coefficients are not sparse and the high-frequency coefficients can have large magnitude. This leads to higher bitrate or reconstruction artefacts around the discontinuities. Recently, the graph-based approach has been proposed, according to which high-dimensional data naturally reside on the vertices of graphs and they can be visualized as a finite collection of samples defined as graph signals, with one sample at each vertex of the graph (see D. I. Shuman, S. K. Narang, P. Frossard, A. Ortega, and P. Vandergheynst, "The emerging field of signal processing on graphs: Extending high-dimensional data analysis to networks and other irregular domains," Signal Processing Magazine, IEEE, vol. 30, no. 3, pp. 83-98, 2013). In the last years, researchers have studied how to apply classical signal processing techniques in the graph domain. Techniques for filtering, translation, modulation and down sampling in the graph domain have been developed. Several graph transforms have also been proposed, such as the graph Fourier transform (G. Taubin, "A signal processing approach to fair surface design", in Proceedings of the 22nd annual conference on Computer graphics and interactive techniques, ACM, 1995, pp. 351-358).

In general, while graph-transforms have been shown to be more efficient than conventional block-based transforms, the overhead of graph transmission may easily outweigh the coding efficiency benefits. Therefore, it is very important to design graph representations and corresponding graph transforms that are efficient also when graph has to be transferred to a decoder.

Sandryhaila et al. in "*Nearest-neighbor image model*", published in ICIP 2012 *proceedings*, propose to represent an image as a graph of nodes and arcs, where the arcs weights are determined so as to minimize the expected distortion at the receiver. However, such work does not teach how to compress the graph's weights, by making difficult to apply this technique in a real-world environment.

In U.S. patent application no. US 2011/206288 A1, Ortega et al. describe an image encoding and decoding system using graph based pixel prediction. This document teaches how to encode and decode pictures through a predictor selection, but it does not teach how to compress the weights graph, by making difficult to apply this technique in a real-world environment.

Kim, Narang and Ortega in "*Graph based transforms for depth video coding*", published in ICASSP 2012 *proceedings*, propose to find the optimal adjacency matrix and compress it using context-based adaptive binary arithmetic coding following a fixed order; however, their work does not teach how to compress the graph's weights, so that the additional bit rate required by the transmission of the weights easily exceeds the theoretical gain in coding efficiency allowed by the optimization.

W. Hu, G. Cheung, A. Ortega, and O. C. Au in "*Multi-resolution graph fourier transform for compression of piecewise smooth images*", published in *IEEE Transactions on Image Processing*, propose to compress the piecewise smooth (PWS) images (e.g., depth maps or animation images) using a graph Fourier transforms (GFT) to minimize the total signal representation cost of each pixel block, considering both the sparsity of the signal's transform coefficients and the compactness of transform description. However, they report unsatisfactory results on natural images, where the cost required to describe the graph outweighs the coding gain provided by the adaptive graph transform.

G. Shen, W. S. Kim, S. K. Narang, A. Ortega, J. Lee, and H. Wey, in "*Edge adaptive transforms for efficient depth map coding*", published in *Picture Coding Symposium (PCS2010) proceedings*, propose an edge-adaptive graph-based transforms (EATs) as an alternative to the standard DCTs used to coding depth maps employed for view synthesis in a multi-view video coding system. These transforms are combined with the DCT in H.264/AVC and a transform mode selection algorithm is used to choose between DCT and EAT in a Rate-Distortion optimized manner. However, also their method gives unsatisfactory results if used on natural images, because of the same reasons explained above.

Narang, Chao and Ortega in "*Critically sampled graph-based wavelet transforms for image coding*", published in *APSIPA* 2013 *proceedings*, propose to encode the image as a binary unweighted graph and encode it using JBIG of size $(2N-1)\times(N-1)$, where N is the number of pixels in the original image. This encoding scheme produces images having a high level of encoding noise, since the binary unweighted graph limits the quantity of information that can be encoded.

In the Italian patent application no. 102015000053132 filed on 18 Sep. 2015, E. Magli and G. Fracastoro describe a digital images or video streams encoding and decoding system using graph based pixel prediction. This document teaches how to quantize each element of the graph's weights matrix, where each elements is processed by means of a non-linear function (e.g., Cauchy function), furthermore this document teaches how to transmit a pixel prediction edge map in place of the more cumbersome weights matrix. However, this document does not teach how to obtain the graph optimizing the rate distortion cost with respect to the video data, because a predefined non-linear function is considered to evaluate the graph's weights.

The problem of designing a graph transform stays critical and may actually represent the major obstacle towards effective compression of images. A few attempts have been recently proposed to optimize (or equivalently to learn) a graph from data observations.

E. Pavez and A. Ortega in "*Generalized Laplacian precision matrix estimation for graph signal processing*", published in *IEEE International Conference on Acoustics Speech and Signal Processing* (ICASSP2016), formulate the graph learning problem as a precision matrix estimation with generalized Laplacian constraints, where the covariance matrix is estimated from the data and is taken as input. However, this approach does not teach how to compress the graph's weights, by making difficult to apply this technique in a real-world environment.

X. Dong, D. Thanou, P. Frossard, and P. Vandergheynst in "*Learning laplacian matrix in smooth graph signal representations*" published in *arXiv preprint arXiv*:1406.7842 (2014), address the problem of learning graph Laplacian, which is equivalent to learning graph topology such that the input data form graph signals have smooth variations on the resulting topology. They impose a Gaussian probabilistic prior on the latent variables of a factor analysis model, which is defined for the graph signals. However, also this approach does not teach how to compress the graph's weights, by making difficult to apply this technique in a real-world environment.

E. Pavez, H. E. Egilmez, E Wang, and A. Ortega in "*GTT: Graph template transforms with applications to image coding*", published in *Picture Coding Symposium (PCS*2015), propose a graph template to impose a sparsity pattern and approximate the empirical inverse covariance based on that template. A constrained optimization problem is solved to learn a graph by optimizing the entries of the matrix of interest. Even this document does not teach how to compress the graph's weights, by making difficult to apply this technique in a real-world environment.

In order to better understand the limits of the state of the art, a brief description of how a graph-based encoding-decoding image system works is provided below.

The architecture of a graph-based encoding-decoding system according to the state of art is illustrated in FIG. 1 and FIG. 2 in terms of its basic functional units.

With reference to FIG. 1 and FIG. 2, in an embodiment of the invention it is assumed that an image f (or a block thereof) has both width and height equal to $\sqrt{N}$, so that it comprises N pixels ($\sqrt{N} \times \sqrt{N} = N$). Furthermore, it is assumed that f is encoded as a grayscale image, 8 bit per pixel, and that f can be also represented by a graph of vertices and arcs (V,A), wherein V are the pixels of the image, and A are the arcs that connect the pixels, defined according to some appropriate criteria. The graph describing the image pixels or samples can be represented as a N×N matrix (i.e., a matrix having $N^2$ elements) that it is referred as weights' matrix W, as discussed later on.

FIG. 1 illustrates an image encoder 150 and an image decoder 170 based on the graph transform which aims to show the limitation of the current state of art about the transmission/memorization of the weights' matrix W.

The encoder 150 includes at least a weights graph generation unit 100, a graph Laplacian unit 110, and a graph transform unit 120.

The weights graph generation unit 100 takes as input said N-pixels image f, and generates the N×N weights' matrix W, which can be computed employing two alternative methods, as described below.

The first method computes the weights' matrix W using a predetermined non-linear function (e.g., Gaussian or Cauchy function). In order to describe how the weights' matrix W is computed, it is assumed that $d_{i,j}$ represents the distance in the grayscale space between the i-th pixel $f_i$ and the j-th pixel $f_j$ of the image f, e.g., $d_{i,j}$ can be computed as the absolute difference between the values of the pixels $f_i$ and $f_j$:

$$d_{i,j} = |f_i - f_j| \tag{1}$$

Therefore, each element of the weights' matrix W can be computed by means of the following Cauchy formula:

$$w_{i,j} = \frac{1}{1 + d_{i,j}} \tag{2}$$

$$i \in N \wedge 1 \le i \le N$$

$$j \in N \wedge 1 \le j \le N$$

It turns out that the value of the weight of the graph arc connecting pixels $f_i$ and $f_j$, i.e., $w_{i,j}$, will be close to 1 ("high" arc weight) if $f_i$ and $f_j$ are similar pixels, whereas the $w_{i,j}$ will be close to 0 ("low" arc weight) if $f_i$ and $f_j$ are dissimilar.

On the other hand, the second method computes the weights' matrix W by learning the weights from the image data f. The learning algorithms known in the art take in to account the smoothness of a graph signal f, which is defined as $$R_c = \frac{1}{2} \sum_{i,j=1}^{N} w_{ij}(f_i - f_j) \tag{3}$$

where $w_{i,j}$ represents the weight on the edge connecting two adjacent vertices i and j, and $f_i$ and $f_j$ are the signal's values associated with these two vertices.

The graph Laplacian unit 110 generates the transform matrix U taking as input the weights' matrix W. This unit is configured for reading W and computing a diagonal matrix E having N×N dimensions such that the i-th element of its diagonal is equal to the sum of all the weights of all the arcs incident into the i-th pixel as described in W; hence, E is defined in matrix notation as shown in the following:

$$E = \text{diag}(W \cdot B1)$$

$$V1 \in R^{N,1} \wedge (\forall x \in N, 1 \le x \le N | V1_{x,1} = 1) \tag{4}$$

After having computed the diagonal matrix E, the unit computes the matrix L (having N×N dimensions), as the difference between the diagonal matrix E and the weights' matrix W; L is a symmetric matrix and is called the Laplacian of W. This computation step is summarized in matrix notation as shown below.

$$L = E - W \tag{5}$$

Finally, the unit computes the N×N matrix U known as transform matrix, wherein the columns of U are the eigenvectors of L, i.e., the columns of U are the vectors that allow to diagonalize L.

The graph transform unit 120 takes as input the image f (which is considered as a vector having N×1 components) and the transform matrix U, and computes the N×1 coefficients vector f^ via the matrix multiplication $$f^\wedge = U^T \cdot f \tag{6}$$

where $U^T$ is the transposed matrix of U.

The encoder then transmits the transform matrix U (or, alternatively, the weights matrix W from which U can be computed) and the coefficients vector f^ to the receiver node over a bandwidth constrained channel or memorizes them on a memory support for later use, e.g., for decoding purposes.

It should be noted that the smoothness of a graph signal f, defined by relation (3), gives an estimation of the rate of the transform coefficients of f; indeed considering the spectral representation of the Laplacian matrix $$L = \sum_{k=1}^{N} \lambda_k \varphi_k \varphi_k^T,$$

where $\lambda$ and $\varphi$ indicates the eigenvalues and the eigenvectors of the L matrix respectively, the smoothness of a graph signal f can be written as $$R_c = f^T L f = f^T \left( \sum_{k=1}^{N} \lambda_k \varphi_k \varphi_k^T \right) f = \sum_{k=1}^{N} \lambda_k (f^T \varphi_k)(\varphi_k^T f) = \sum_{k=1}^{N} \lambda_k \hat{f}_k^2 \quad (7)$$

Relation (7) shows that the smoothness of a graph signal f, is proportional to the square of the coefficients $\{\hat{ff}_k\}$ where, as well known in the state of art, the coefficients' size determine their transmission rate. Therefore, if a graph signal f is smooth (lowering of $R_C$) then the rate of the transform coefficients of said signal f decreases.

The decoder 170 includes, at least, a graph Laplacian unit 140 and inverse graph transform unit 180 configured for reading, from a storage device or through a communication channel, both the weights matrix W and the coefficients vector f^. For sake of simplicity, we assume that both W and f^ available to the decoders 170 are identical to those generated by the encoders 150, since in practical applications adequate measures are taken for minimizing read/write or channel errors occurring during information transfer from the encoder to the decoder.

The graph Laplacian unit 140, which is functionally analogous to the counterpart found at the transmitter side (unit 110), takes in input the weights' matrix W and generates the transform matrix U as described above for the encoder counterpart.

The inverse graph transform unit 180 takes U and f^ as inputs and recovers the original image f by computing its representative samples' vector f. In order to perform this task, the unit 180 internally inverts the matrix $U^T$ by generating the N×N inverse transform matrix $(U^T)^{-1}$ which is, in the present case, equal to the matrix U, since U is composed by the eigenvectors of the Laplacian matrix of W; after that, the unit recovers the original image f via the following matrix multiplication which is known as the inverse graph Fourier transform:

$$f = (U^T)^{-1} \cdot \hat{f} \quad (8)$$

Clearly, this first encoding-decoding approach makes necessary that the encoder conveys to the decoder both the weights' matrix W, whose dimension is in the order of $N^2$ elements even when the graph optimizing problem is addressed, and the coefficients vector f^ whose dimension is in the order of N.

FIG. 2 illustrates another image encoder 210 and an image decoder 230 based on the graph transform which aims to show the limitation of the current state of art about the transmission/memorization of an edge map instead of the weights matrix and the coefficients vector f^. The term "edge" in the context of this prior art technique means contour, border of the image and not arc of a graph associated to the image, as the case will be during the subsequent description of the present invention.

The encoder 210 includes at least an edge map generation unit 215, a reconstructed weights graph generation unit 212, a graph Laplacian unit 213, and a graph transform unit 216.

The edge map generation unit 215 takes as input said N-pixels image f forming an N×1 vector f, and generates the N×1 edge map f', where each element $f'_i$ denotes whether the pixel $f_i$ is an edge or not: first the N×N weights' matrix W is computed using the Cauchy formula given by relation (2), wherein the pixel distances $d_{i,j}$ are quantized considering the two levels d and D (d<D), and then an edge-prediction algorithm is applied in order to obtain the edge map f' given the weights' matrix W.

The reconstructed weights graph generation unit 212 takes as input said N×1 edge map f' and outputs the reconstructed N×N weights' matrix W', by reverting the edge-prediction algorithm.

The graph Laplacian unit 213 generates the transform matrix U taking as input the reconstructed weights matrix W', by performing the same actions described in the unit 110.

The graph transform unit 216 takes as input the image f (which is considered as a vector f having N×1 components, i.e., the pixels or samples of the luminance matrix) and the transform matrix U, then computes the N×1 coefficients vector f^, by performing the same actions accomplished by the unit 120.

The encoder then transmits the edge map f' and the coefficients vector f^ to the receiver node over a bandwidth constrained channel or memorizes them on a memory support for later use, e.g., for decoding purposes.

The decoder 230 includes, at least, a reconstructed weights graph generation unit 232, a graph Laplacian unit 233 and inverse graph transform unit 231, and is configured for reading, from a storage device or through a communication channel, both the edge map f' and the coefficients vector f^. For sake of simplicity, we assume that both f' and f^ available to the decoders 230 are identical to those generated by the encoders 210, since in practical applications adequate measures are taken for minimizing read/write or channel errors occurring during information transfer from the encoder to the decoder.

The reconstructed weights graph generation unit 232 and the graph Laplacian unit 233, are functionally analogous to the counterpart found at the transmitter side. The reconstructed weights graph generation unit 232 takes in input the edge map f' and generates the reconstructed weights' matrix W', subsequently the graph Laplacian unit 233 takes in input the reconstructed weights' matrix W' and generates the transform matrix U as described above for the encoder counterpart.

The inverse graph transform unit 231 takes U and f^ as inputs and outputs the recovered image f^, by performing the same actions described in the unit 180.

This second encoding-decoding approach makes necessary that the encoder conveys to the decoder both the edge map f' and the coefficients vector f^, which have both dimension in the order of N. However, this second encoding-decoding approach does not take in to account the graph optimization problem.

In real world applications, the communication takes place over a bandwidth constrained channel, it is hence desirable that either (or both) f^ and W can undergo some effective form of compression prior they are put on the channel. The same applies to the memorization of the image f on a storage unit having limited capacity.

Regarding the problem of compressing the coefficients vector f^, its properties are such that it can be effectively compressed via existing entropy-based coding schemes.

Conversely, the weights' matrix W cannot be effectively compressed by means of any of the existing compression techniques, since its properties do not enable efficient compression.

For solving the graph optimization problem for natural images, the prior art only considers the smoothness of the graph, which is not enough to achieve satisfactory performances.

SUMMARY OF THE INVENTION

The present invention aims to solve these and other problems by providing a method and an apparatus for encoding and/or decoding digital images or video streams which effectively increases the coding efficiency of GFT (Graph Fourier Transform)-based image or video coding and decoding techniques.

The basic idea of the present invention is to encode the graph by treating its edge weights as a graph signal that lays on the corresponding dual-graph. The graph Fourier transform of the weights is evaluated and the transformed weights are quantized. The choice of the graph is posed as a rate-distortion optimization problem that is cast as a graph learning problem. The cost of coding the image signal is captured by minimizing the smoothness of the image on the learned graph, while the transmission cost of the topology is controlled by penalizing the sparsity of the graph Fourier coefficients of the edge weight signal that lies on the dual-graph. The solution of the optimization problem is a graph that provides an effective trade-off between the quality of the transform and its transmission cost.

BRIEF DESCRIPTION OF DRAWINGS

The characteristics and other advantages of the present invention will become apparent from the description of an embodiment illustrated in the appended drawings, provided purely by way of no limiting example, in which.

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 11:
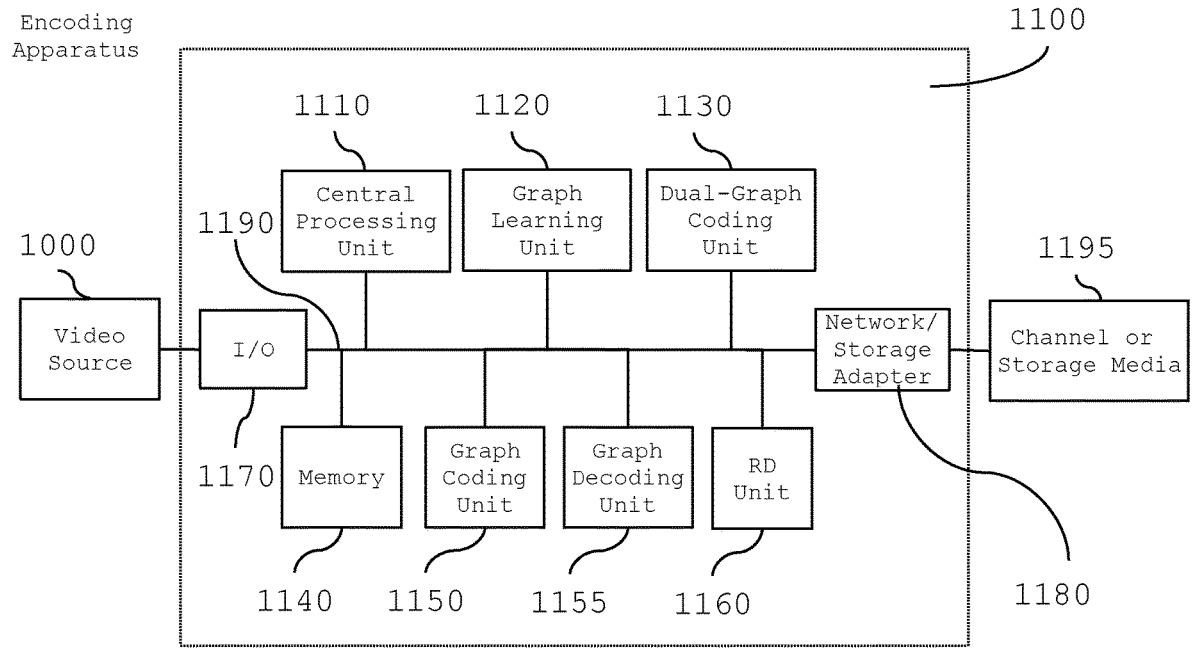
FIG. 11 shows a block diagram illustrating apparatuses for compressing digital images or video streams according to the present invention.

With reference to FIG. 11, an apparatus 1100 for compressing digital images or video streams (also named encoding apparatus 1100) comprises the following parts:

processing means 1110, like a Central Processing Unit (CPU), configured for executing a set of instruction for carrying out a method for encoding digital images or video streams according to the invention (said method will be described in details in the following of present description);

memory means 1140 like a semiconductor based memory unit, volatile or non volatile, containing data relating to the image to be compressed and preferably the instructions that implement the method for encoding digital images or video streams according to the invention, wherein the image data are a representation of at least a portion of said image and are preferably in binary format, and wherein said memory means 1140 may also contain the result of the execution of instructions of said method;

input means 1170, e.g., an I/O (Input/Output) unit, which can be configured by the CPU 1110 to read from a (video) source 1000 images or video streams to be processed; such input means may for example include a data communication adapter according to at least one of the following standards: USB, Firewire, RS232, IEEE 1284, Ethernet, TCP/IP, Wi-Fi, or the like;

a graph learning unit 1120, which is configured for executing a portion of at least one phase of the method for solving the problem to obtain the optimum weights of the graphs representing digital images or video streams according to the invention; in particular, this unit is configured for taking in to account the cost of transformed coefficients and the cost of the graph description, where the weights of the graph are treated as a signal laying on its dual-graph, obtaining the optimum weights' vector w* and then storing it in the memory means 1140;

a dual-graph coding unit 1130, which is configured for executing a portion of at least one phase of the method for encoding the optimum weights' vector w* according to the invention; in particular, this unit is configured for performing the graph Fourier transform of the optimum weights w* on the dual-graph, wherein the transformed optimum weights $\hat{w}$* is quantized according to a set of predetermined quantization parameters $\{\Delta_i\}$, obtaining the set of quantized and transformed optimum weights $\{\hat{w}_i^*\}$ and then storing it in the memory means 1140;

a graph coding unit 1150, which is configured for fetching the original image or video stream from the memory unit 1140, executing a portion of at least one phase of the method for encoding digital images or video streams according to the invention; in particular, this unit is configured for performing the graph Fourier transform of the image or video data, wherein said graph Fourier transform is determined as a function of the quantized and transformed optimum weights' vectors $\{\hat{w}_i^*\}$ for each weights' quantization parameters $\{\Delta_i\}$, obtaining the set of coefficients $\{\hat{f}_i\}$ which are quantized according to a predetermined quantization parameter q, and storing the resulting set of coefficients $\{\hat{f}_i^q\}$ back into the memory unit 1140;

a graph decoding unit 1155, which is configured for executing a portion of at least one phase of the method for decoding digital images or video streams according to the invention; in particular, this unit is configured for performing a de-quantization process of the set of coefficients $\{\hat{f}_i^q\}$ using said predetermined quantization parameter q, and by performing the inverse graph Fourier transform of the de-quantized coefficients $\{\hat{f}_i\}$, wherein said inverse graph Fourier transform is determined as a function of the quantized and transformed optimum weights $\{\hat{w}_i^*\}$ for each weights' quantization parameters $\{\Delta_i\}$, obtaining a set of reconstructed digital images or video streams $\{\dot{f}_i\}$ and storing said set into the memory unit 1140;

a rate-distortion cost evaluation unit 1160, which is configured for fetching from the memory means 1140 the set of reconstructed signals $\{\dot{f}_i\}$, computing the rate-distortion costs $\{RD_i\}$ for each weights' quantization parameters $\{\Delta_i\}$ by taking into account the rate-distortion cost related to both the set of reconstructed signals $\{\dot{f}_i\}$ and the set of the reconstructed optimum weights' vectors $\{\dot{w}_i^*\}$, and choosing the weights' quantization parameter $\Delta$, the quantized and transformed optimum weights' vector $\hat{w}$* and the quantized and transformed image's coefficients $\hat{f}^q$ on the basis of the best rate-distortion costs $\{RD_i\}$, and storing said selected values into the memory unit 1140;

output means 1180 (e.g., a network or storage adapter), which can be configured by the CPU 1110 to transmit, through a communication channel, the processing result to a destination 1195 (e.g., a storage media, a remote client or the like); such output means may for example include a data communication adapter according to at least one of the following standards: Ethernet, SATA, SCSI, or the like;

a communication bus 1190, which allows the exchange of information between the CPU 1110, the graph learning unit 1120, the dual-graph coding unit 1130, the memory means 1140, the graph coding unit 1150, the graph decoding unit 1155, rate-distortion unit 1160, the input means 1170, and the output means 1180. As an alternative to using the communication bus 1190, the CPU 1110, the graph learning unit 1120, the dual-graph coding unit 1130, the memory means 1140, the graph coding unit 1150, the graph decoding unit 1155, rate-distortion unit 1160, the input means 1170, and the output means 1180 can be connected by means of a star architecture.

The video source 1000 can be either a provider of live images, such as a camera, or a provider of stored contents such as a disk or other storage and memorization devices. The Central Processing Unit (CPU) 1110 takes care of activating the proper sequence of operations performed by the units 1120, 1130, 1150, 1155, 1160 in the encoding process performed by the apparatus 1100. These units can be implemented by means of dedicated hardware components (e.g., CPLD, FPGA, or the like) or can be implemented through one or more sets of instructions stored in a memory unit 1140 which are executed by the CPU 1110; in the latter case, the units 1120, 1130, 1150, 1155, 1160 are just logical (virtual) units.

When the apparatus 1100 is in an operating condition, the CPU 1110 first fetches the image from the video source and loads it into the memory unit 1140.

Next, the CPU 1110 activates the graph learning unit 1120, which fetches the original image f from the memory 1140, executes a portion of at least one phase of the method for learning the optimum weights' vector w* from the image f according to the invention (see FIG. 3a), and stores the resulting optimum weights' vector w* back into the memory unit 1140.

Successively, the CPU 1110 activates the dual-graph coding unit 1130, which fetches from the memory 1140 the optimum weights' vector w*, executes a portion of at least one phase of the method for encoding (on the basis of the dual-graph) and for quantizing the optimum weights' vector w* according to the present invention (see FIG. 3a), and which stores the resulting set of quantized and transformed optimum weights $\{\hat{w}_i^*\}$ back into the memory unit 1140.

Next, the CPU 1110 activates the graph coding unit 1150, which fetches from the memory 1140 the set of quantized and transformed optimum weights $\{\hat{w}_i^*\}$, executes at least part of a phase of the method for encoding and quantizing digital images or video streams according to the invention (see FIG. 3b), and stores the resulting set of quantized coefficients $\{\hat{f}_i^q\}$ back into the memory unit 1140.

Then the CPU 1110 activates the graph decoding unit 1155, which fetches from the memory 1140 the set of quantized coefficients $\{\hat{f}_i^q\}$, executes a portion of at least one phase of the method for decoding images or video stream according to the present invention (see FIG. 3b), and stores the set of reconstructed digital images or video streams $\{\dot{f}\}$ in the memory 1140.

Next, the CPU 1110 activates the rate-distortion cost evaluation unit 1160, which fetches from the memory the set of reconstructed digital images or video streams $\{\dot{f}_i\}$, executes a portion of at least one phase of the method for computing the rate-distortion cost of images or video stream according to the present invention (see FIG. 3c), and chooses the weights' quantization parameter Δ, the quantized and transformed optimum weights' vector $\hat{w}^*$ and the quantized and transformed image's coefficients $\hat{f}^q$ on the basis of the best rate-distortion costs $\{RD_i\}$ (i.e., the lowest cost), and stores them into the memory 1140.

At this point, the CPU 1110 may dispose of the data from the memory unit 1140 which are not required anymore at the encoder 1100.

Finally, the CPU 1110 fetches the weights' quantization parameter Δ, the quantized and transformed optimum weights' vector $\hat{w}^*$ and the quantized and transformed image's coefficients $\hat{f}^q$ from memory 1140 and transmits them through the communication channel or saves them into the storage media 1195 by means of the output means 1180.

Figure 12:
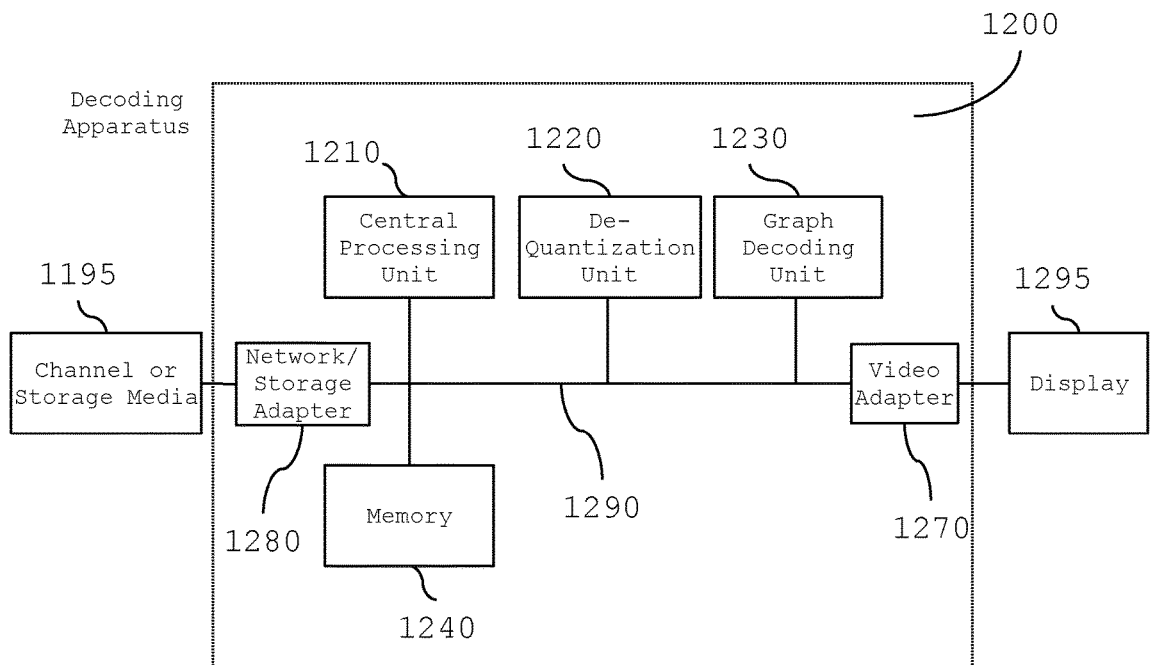
FIG. 12 shows a block diagram illustrating apparatuses for decompressing digital images or video streams according to the present invention.

With reference also to FIG. 12, an apparatus 1200 for decompressing digital images or video streams (also named decoding apparatus 1200) comprises the following parts:

processing means 1210, like a Central Processing Unit (CPU), configured for executing a set of instruction for carrying out a method for decoding digital images or video streams according to the invention (said method will be described in details in the following of present description);

memory means 1240 like a volatile or non volatile, semiconductor based memory unit containing data relating to the compressed image received and preferably the instructions that implement the method for decompressing digital images or video streams according to the invention, wherein the image data are a representation of at least a portion of said image and are preferably in binary format, and wherein said memory means 1240 may also contain the result of the execution of instructions of said method;

input means 1280 (e.g., a network or storage adapter), which can be can be configured by the CPU 1210 to read the encoded images or video streams from a communication channel or storage media 1200; said input means 1280 may for example comprise a data communication adapter according to at least one of the following standards: Ethernet, SATA, SCSI, or the like;

a graph de-quantizing unit 1220, which is configured for executing a portion of at least one phase of the method for receiving the weights' quantization parameter Δ, the quantized and transformed optimum weights' vector $\hat{w}^*$, and the quantized and transformed image's coefficients vector $\hat{f}^q$, and is configured for executing a portion of at least one phase of the method for de-quantizing $\hat{w}^*$ and $\hat{f}^q$ on the basis of the quantization parameters Δ and q respectively;

a graph decoding unit 1230, which is configured for executing a portion of at least one phase of the method for decompressing digital images or video streams according to the invention; in particular, this unit is configured for performing an inverse graph Fourier transform which is determined as a function of the quantized and transformed optimum weights $\hat{w}^*$, such that the reconstructed image $\hat{f}$ is recovered;

output video means 1270, like a video adapter, which can be configured by the CPU 1210 to reproduce and/or output, preferably on a display 1295, the processed (decoded or decompressed) images or video streams; said output video means may for example include an adapter according to at least one of the following standards: VGA, S-video, HDMI, Ethernet, or the like;

a communication bus 1290, which allows the exchange of information between the CPU 1210, the de-quantization unit 1220, the graph decoding unit 1230, the memory means 1240, the output video means 1270, and the input means 1280. As an alternative to using the communication bus 1290, the CPU 1210, the de-quantization unit 1220, the graph decoding unit 1230, the memory means 1240, the output video means 1270, and the network or storage adapter 1280 can be connected by means of a star architecture.

As for the previously described encoding apparatus 1100, also the CPU 1210 of the decoding apparatus 1200 takes care of activating the proper sequence of operations performed by the units 1220 and 1230. These units can be implemented by means of dedicated hardware components (e.g., CPLD, FPGA, or the like) or can be implemented through one or more sets of instructions which are executed by the CPU 1210; in the latter case, the units 1220 and 1230 are just a logical (virtual) units.

When the apparatus 1200 is in an operating condition, the CPU 1210 first fetches the weights' quantization parameter Δ, the quantized and transformed optimum weights' vector $\hat{w}^*$ and the quantized and transformed image's coefficients vector $\hat{f}^q$ received from the channel or the storage media 1195, and loads them into the memory unit 1240.

Then, the CPU 1210 activates the graph de-quantizing unit 1220, which receives from the memory 1240 the weights' quantization parameter Δ, the quantized and transformed optimum weights' vector $\hat{w}^*$ and the quantized and transformed image's coefficients vector $\hat{f}^q$, executes a portion of at least one phase of the method for de-quantizing vectors $\hat{w}^*$ and $\hat{f}^q$ on the basis of the quantization parameters Δ and q respectively and, according to the invention (see FIG. 4), stores into the memory means 1240 the de-quantized and transformed optimum weights' vector $\hat{\hat{w}}^*$ and the de-quantized and transformed image's coefficients vector $\hat{\hat{f}}$.

Then, the CPU 1210 activates the graph decoding unit 1230, which fetches from the memory 1240 the de-quantized and transformed optimum weights' vector $\hat{\hat{w}}^*$ and the de-quantized and transformed image's coefficients vector $\hat{\hat{f}}$, executes a portion of at least one phase of the method for decompressing images or video streams according to the invention (see FIG. 4), and stores into the memory means 1240 the recovered image or video signal vector $\hat{f}$ comprising the reconstructed image pixels that can easily be rearranged to form the original bidimensional pixel grid of the image.

At this point, the CPU 1210 may dispose of the data from the memory which are not required anymore at the decoder side.

Finally, the CPU may fetch from memory 1240 the recovered image $\hat{f}$ and send it, by means of the video adapter 1270, to the display unit 1295 for its visualization.

It should be noted how the encoding and decoding apparatuses described in the figures may be controlled by the CPU 1210 to internally operate in a pipelined fashion, enabling to reduce the overall time required to process each image, i.e., by performing more instructions at the same time (e.g., using more than one CPU and/or CPU core).

It should also be noted than many other operations may be performed on the output data of the coding device 1100 before sending them on the channel or memorizing them on a storage unit, like modulation, channel coding (i.e., error protection). Conversely, the same inverse operations may be performed on the input data of the decoding device 1200 before effectively process them, e.g., demodulation and error correction. Those operations are irrelevant for embodying the present invention and will be therefore omitted.

Besides, the block diagrams shown in FIG. 11 and FIG. 12 are of exemplificative nature only; they allow to understand how the inventions works and how it can be realized by the person skilled in the art. The skilled person understands that these charts have non limitative meaning in the sense that functions, interrelations, and signals shown therein can be arranged in many equivalents ways; for example, operations appearing to be performed by different logical blocks can be performed by any combination of hardware and software resources, being also the same resources for realizing different or all blocks.

The encoding process and the decoding process will now be described in detail.

Encoding

Figure 5:
FIG. 5 shows an example of a grayscale image f (FIG. 5(a)) and an exemplary image block (FIG. 5(b)) of said grayscale image f.
Figure 5:
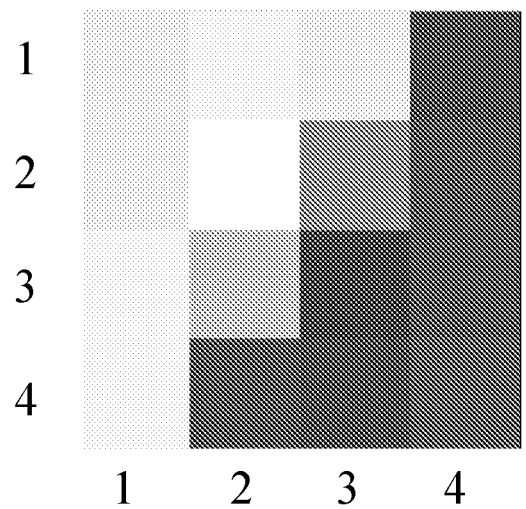

In order to show how the encoding process occurs, it is assumed that the image f (or a block thereof) to be processed is preferably a grayscale image where each pixel is encoded over 8 bit so that the value of said pixel can be represented by means of an integer value ranging between 0 and 255, see the example of f shown in FIG. 5(a), wherein FIG. 5(b) shows a 4×4 pixel subset of FIG. 5(a).

With also reference to FIG. 6(b), the image f is represented by means of an N×1 vector f where the i-th element preferably corresponds to the i-th pixel in the image f counted in raster scan order; hence, FIG. 6(a) shows a possible way of vectorising the image block representation starting from a bi-dimensional matrix or graph form, wherein the nodes represent the pixels and the arcs denote the horizontal and vertical adjacencies, and wherein the block has a square shape and N is assumed to be 16. Each n-th pixel (node) is numbered according to the raster scan order from 1 to 16 and transformed in the n-th element of image vector f (FIG. 6(b)). Therefore, for example, in an embodiment of the invention pixel 6 (i.e., $f_6$) is considered adjacent only to pixels 2 ($f_2$), 5 ($f_5$), 7 ($f_7$) and 10 ($f_{10}$), while pixel 13 ($f_{13}$) is adjacent to pixels 9 ($f_9$) and 14 ($f_{14}$).

Furthermore, FIG. 6(a) shows the 4-connected grid graph topology which is the most used for graph-based image compression, since its number of edges is not too high, and so the coding cost is limited. Indeed, in a 4-connected square grid with N nodes, there are M 32 $2\sqrt{N}(\sqrt{N}-1)$ edges. Moreover, others graph topologies can be considered, FIG. 7(a) shows an 8-connected square grid graph topology with N nodes, wherein that case there are $M=2(\sqrt{N}-1)(2\sqrt{N}-1)$ edges.

Figure 8:
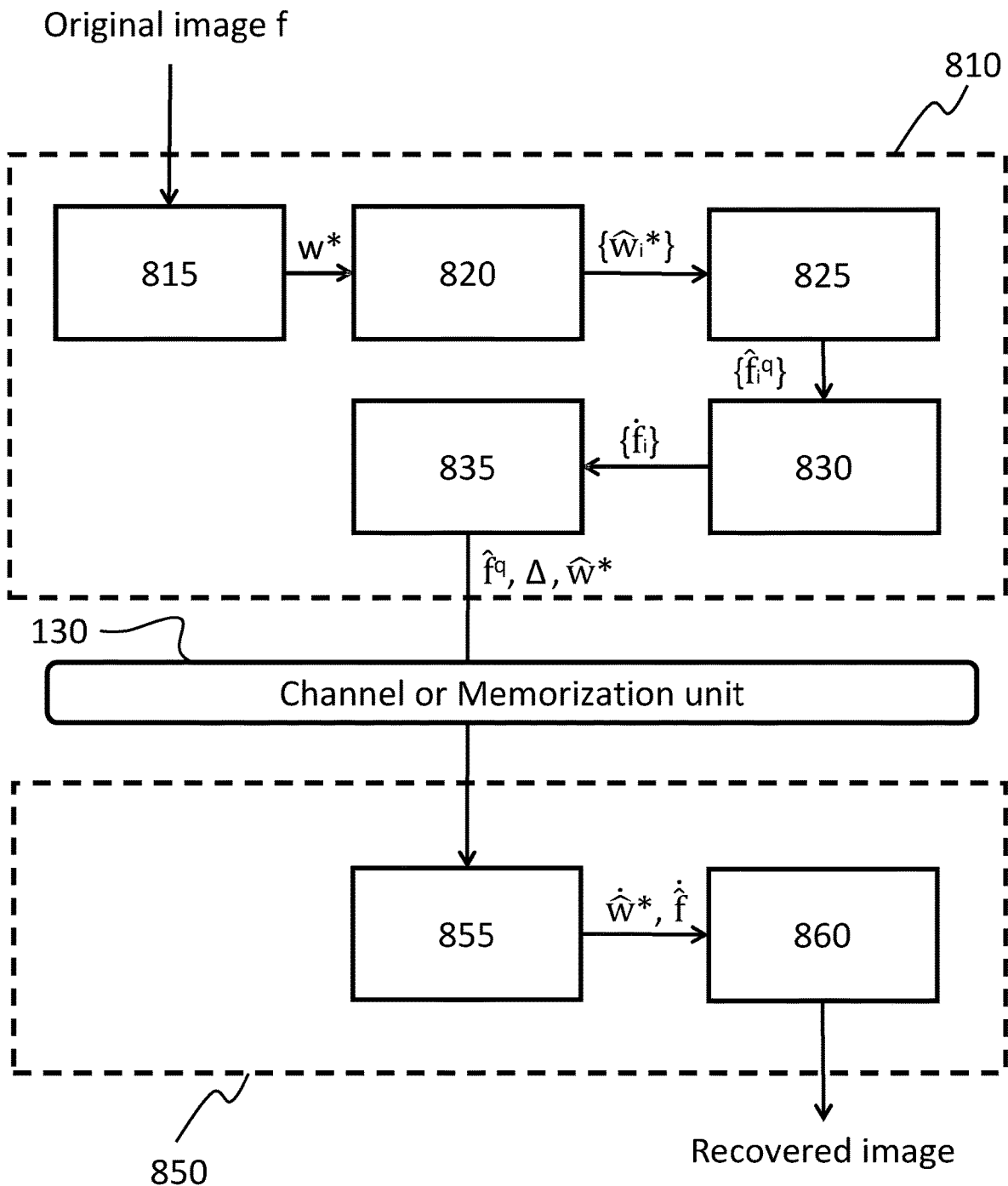
FIG. 8 shows a block diagram illustrating logical or physical units of apparatuses configured to compress/decompress digital images or video streams according to the present invention.

With also reference to FIG. 8, it is now described how the different parts of the encoding apparatus 810 interact for compressing digital images or video streams.

Figure 1:
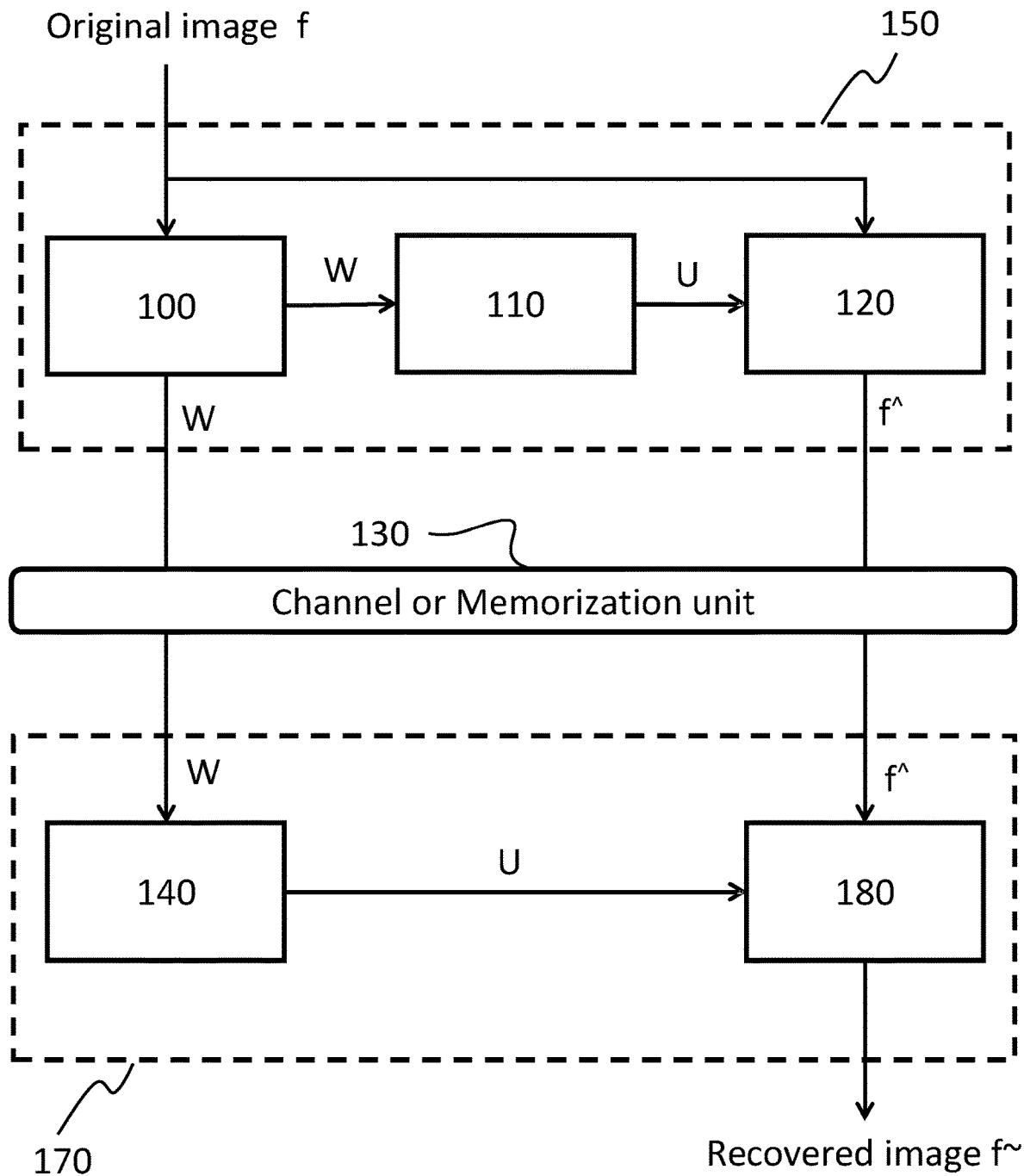
FIG. 1 shows a block diagram of a reference graph-based image encoding-decoding system according to the state of art.
Figure 2:
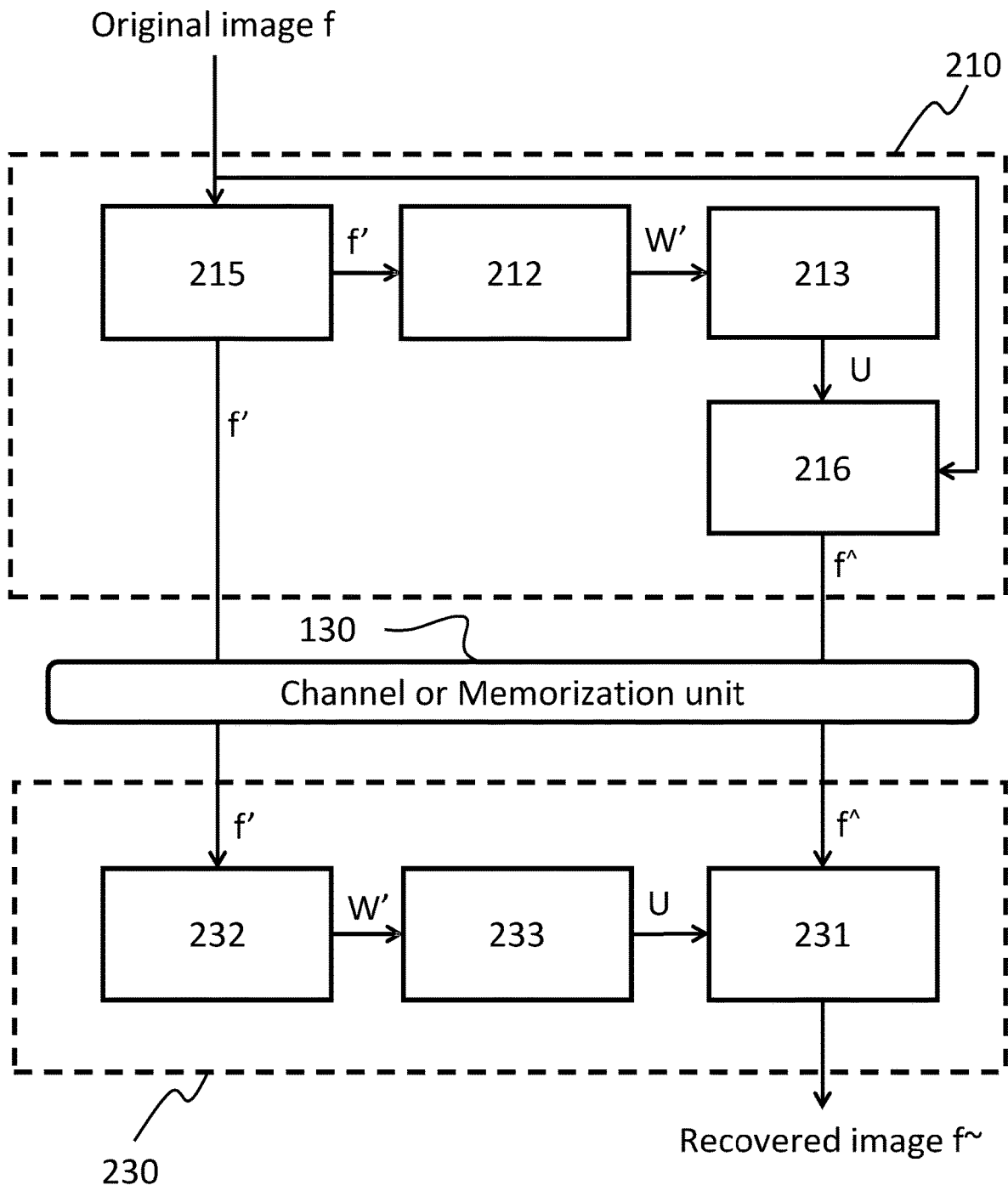
FIG. 2 shows another block diagram of a second reference graph-based image encoding-decoding system according to the state of art.
Figure 3A:
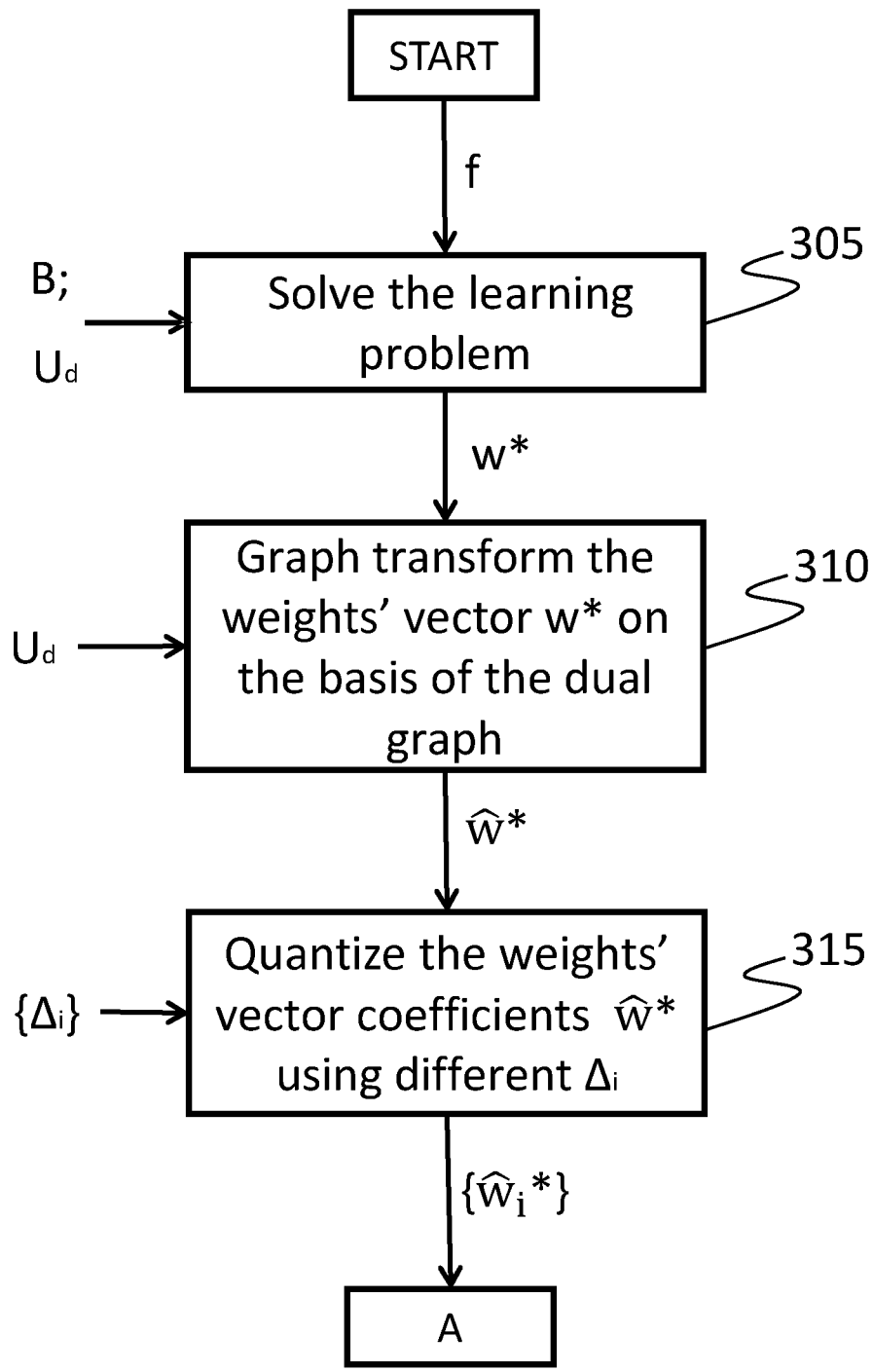
FIGS. 3a, 3b, and 3c show a flowchart depicting the functioning of the apparatus for encoding digital images or video streams according to the present invention.
Figure 9:
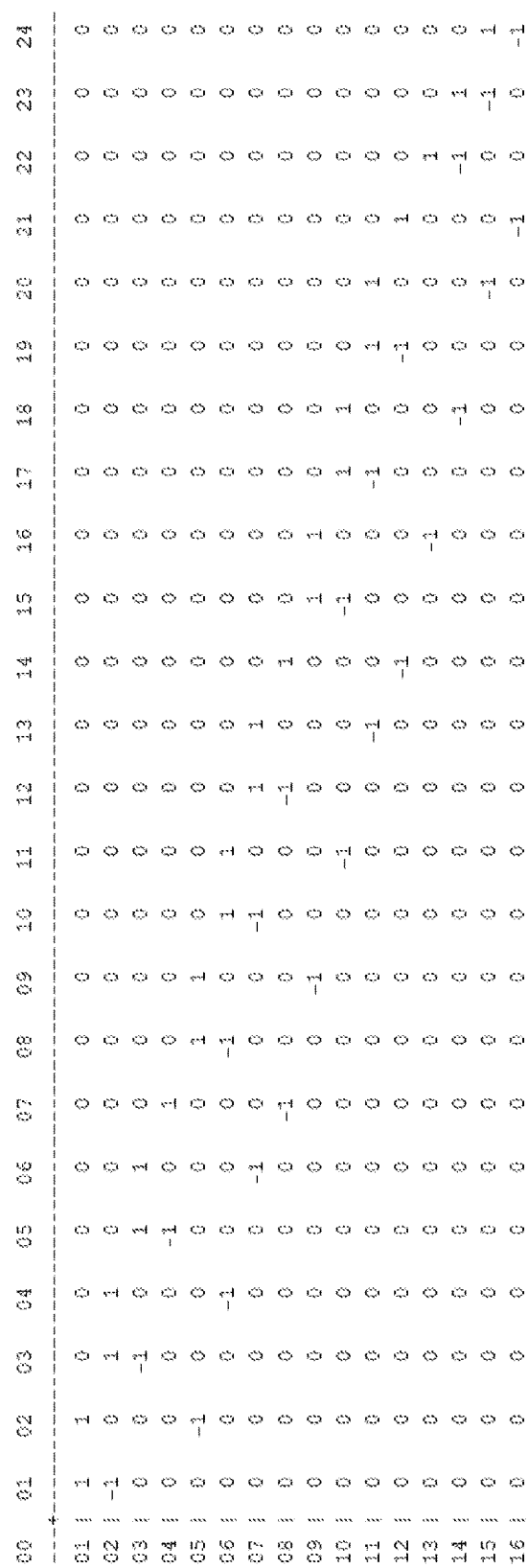
FIG. 9 shows an exemplary incident matrix (B) of a 4-connected square grid graph representing an image block composed by 4×4 pixels.

With also reference to FIG. 3a, the graph learning unit 815 preferably comprises the following (physical or logical) parts:

A learning problem solve unit 305 configured for solving the optimization problem described by the following expression (or equivalent)

$$w^* = \underset{w \in (0,1]^M}{\operatorname{argmin}} \{ f^T B(\operatorname{diag}(w)) B^T f + \alpha \| U_d^T w \|_1 - \beta 1^T \log(w) \} \quad (9)$$

wherein the graph topology is fixed (e.g., 4-connected square grid) and the graph's weights are collected in the M×1 vector w, which can be varied. The topology of a graph having N nodes and M edges is described by the N×M incidence matrix B such that $$B_{ie} = \begin{cases} +1, & \text{if } e = (i, j) \\ -1, & \text{if } e = (j, i) \\ 0, & \text{otherwise} \end{cases} \quad (10)$$

where e=(x,y) means that there is an edge having index e from node x to y; the orientation of the edges can be chosen arbitrarily; e is an integer comprised between 1 and M. FIG. 9 shows an example of the incidence matrix for a block of 4×4 pixels where the 4-connected square grid graph topology is considered, like that represented in FIG. 6 with the corresponding edge labels; the initial zeros of the vertices' and edges' indexes have been omitted in the graph picture; the edges' orientation (not shown) has always been chosen from the lower to the higher node index. The first term of the mathematical formula (9) takes into account the cost of the transform coefficients Rc of the image f, while the second term of the mathematical formula (9) takes into account the cost of the graph description RG. The logarithmic term of the mathematical formula (9) penalizes low weight values avoiding the all-zero weights trivial solutions. The real parameters α and β can be chosen on the basis of some characteristics of the image (or for each block thereof), such as a measure of complexity of the image structure performed, for example by the structure tensor analysis (I. Rotondo, G. Cheung, A. Ortega, and H. E. Egilmez, "Designing sparse graphs via structure tensor for block transform coding of images", published in APSIPA2015).

The cost of the transform coefficients Rc of the image f (or a block thereof) is evaluated considering the smoothness of the image f on graph, which is obtained by the following relation $$Rc = \frac{1}{2} \sum_{i,j=1}^{N} w_{ij}(f_i - f_j) = f^T L f = f^T B(\operatorname{diag}(w)) B^T f \quad (11)$$

where L=B (diag (w)) $B^T$ is the graph's Laplacian matrix and W is the weights' matrix of the graph (referred with the term $w_{i,j}$), which is related to the weights' vector w as $w_e = W_{i,j}$, wherein e=(i, j) is the index of the edge connecting node i to node j of the weights' matrix W. The expression diag(x) indicates a diagonal matrix whose diagonal entries starting in the upper left corner are the elements $x_1$, $x_2$, ..., $x_n$ of the vector x.

Figure 10:
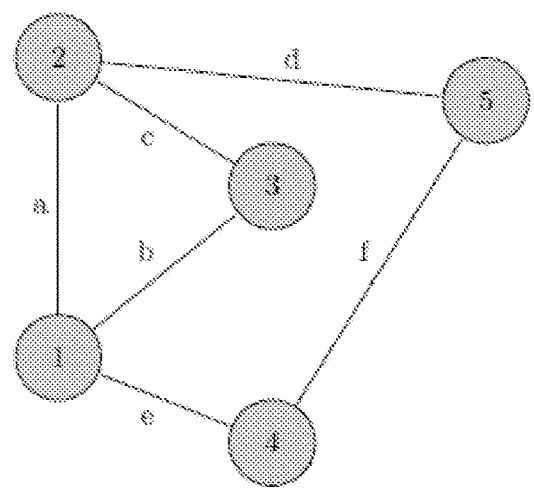
FIG. 10 shows an exemplary graph (FIG. 10(a)) and its corresponding dual-graph (FIG. 10(b))
Figure 10:
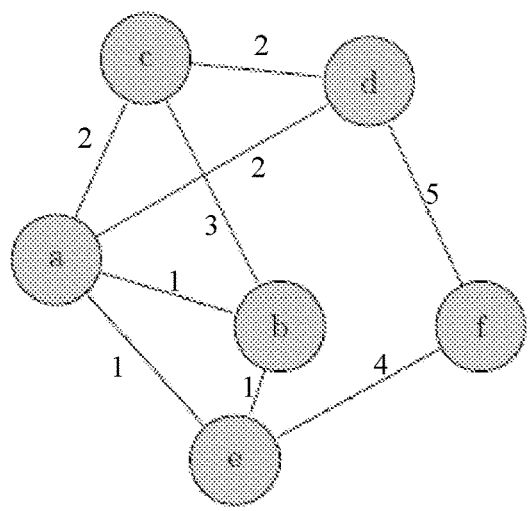

The cost of the graph description RG is obtained by considering the edge weights' vector was a signal that lays on the corresponding dual-graph. Given a graph, its dual-graph is an unweighted graph where each node represents an edge of the graph, and two nodes of dual-graph are connected if and only if their corresponding edges in the graph share a common endpoint. FIG. 10 shows an example of a graph (FIG. 10(a)) and its corresponding dual-graph (FIG. 10(b)): the edges in the graph, labelled with lower case letters, become the nodes of the corresponding dual-graph, labelled with integers. Because consecutive edges between adjacent nodes usually have similar weights, choosing the dual-graph allows to provide smooth representation of the weights' vector w. For the dual-graph related to the image f, the M×M Laplacian matrix Ld can be computed using relations (4) and (5); the eigenvectors of Ld define the transform matrix of the dual-graph Ud. The cost of the graph description $R_G$ is taken in to account in the formula (9) by the following mathematical expression $$R_G = \alpha \|U_d^T w\|_1 \quad (12)$$

where the symbol $$\|v\|_1 = \sum_i |v_i|$$

indicates the 1-norm of a vector v, and $U_d^T$ is the transposed transform matrix of the dual-graph.

The output of the learning problem solve unit 305 is the optimum weights' vector w* evaluated in terms of the optimization problem given by relation (9). It should be noted that in the prior art, the problem to learn the weights from the graph is addressed by considering only the smoothness of the graph, or is completely neglected by assigning the weight of the graph using for example the Cauchy formula given by relation (2). The choice to address the minimization of the overall rate distortion cost assures the best result in terms of coding efficiency; instead, considering the graph smoothness or using the Cauchy function does not guarantee the best coding efficiency as in the present invention.

With also reference to FIG. 3a the dual-graph coding unit 820 preferably comprises the following (physical or logical) parts:

a graph transform computation unit 310 configured to compute the graph Fourier transform of the optimum weights' vector w* on the dual-graph of the image f, by the following mathematical expression $$\hat{w}^* = U_d^T w^* \quad (13)$$

where the optimum weights' vector w* is considered as a signal that lays on the dual-graph. Since consecutive edges usually have similar weights, choosing the dual-graph allows to take into account only the first $\tilde{M}<M$ coefficients, which usually are the most significant, and setting the other $M-\tilde{M}$ coefficients to zero. Optionally the graph transform computation unit 310 can insert into the output data bitstream the value of $\tilde{M}$ or of the difference $M-\tilde{M}$ in order to inform the decoder of the number of edge weights that have been neglected and not inserted into the stream. Therefore, the number of the components of the transformed weights' vector $\hat{w}^*$ can be reduced from M to $\tilde{M}$, this implies a reduction of the cost of the graph description, which is impossible in the original, non dual-graph. In other words, the processing means 1110 are also configured for reducing the size of the weights vector ($\hat{w}^*$), and transmitting the original size of said weights vector ($\hat{w}^*$) through the output means 1180. In this way, the coding/decoding efficiency is increased.

a weights quantization unit 315 configured to quantize the transformed optimum weights' vector $\hat{w}^*$ by means of a set of Q weights' quantization parameters $\Delta_1, j\Delta_2, \ldots, \Delta_Q$, obtaining the corresponding quantized and transformed optimum weights' vector $\hat{w}_i^* = \text{round}(\hat{w}^*/\Delta_i)$ for each weights' quantization parameters, where $i=1, 2, \ldots, Q$ and round(x) means rounding x to the nearest integer.

Figure 3B:
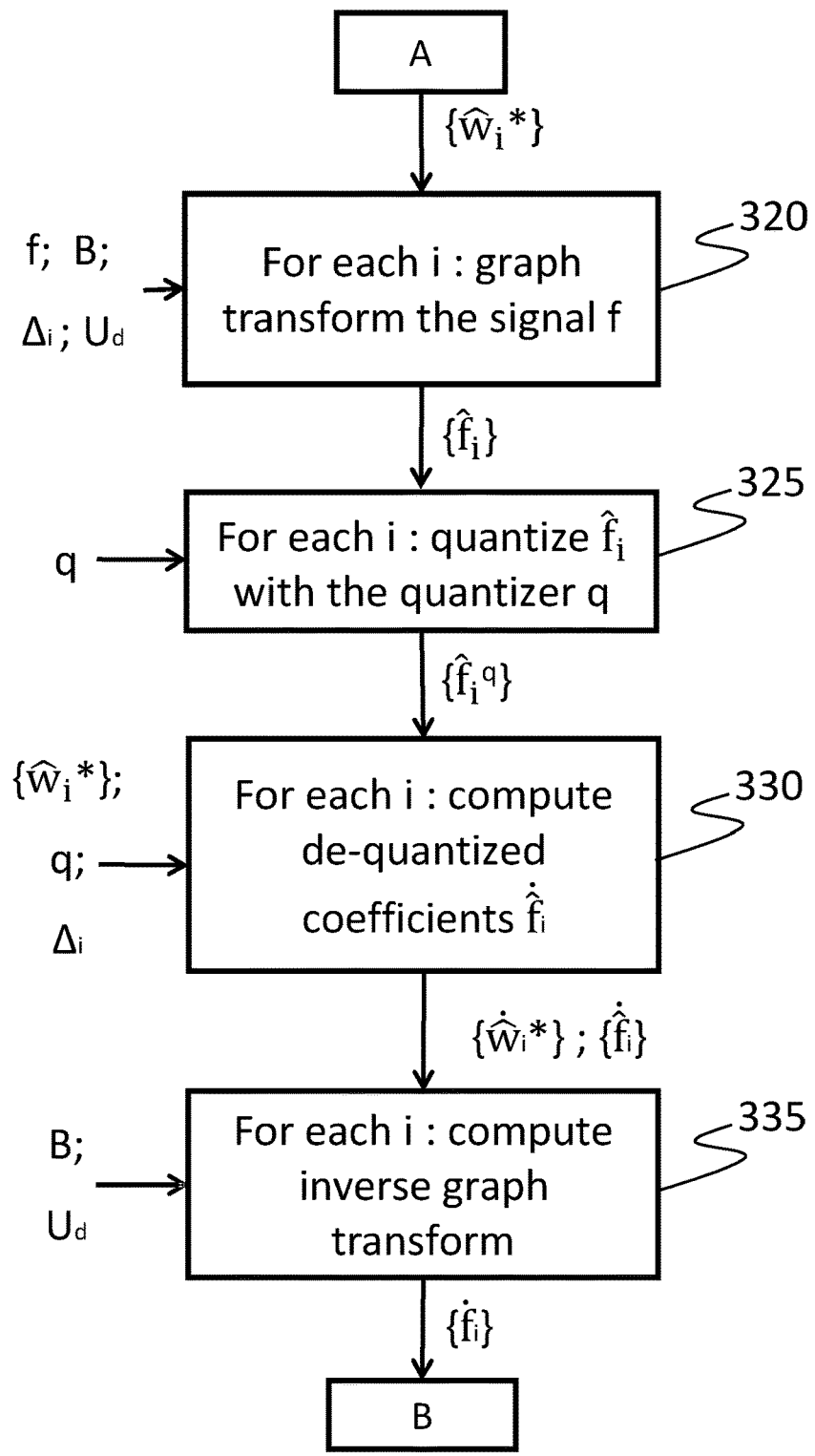

With also reference to FIG. 3b the graph coding unit 825 preferably comprises the following (physical or logical) parts:

a graph transform computation unit 320 configured to compute the graph Fourier transform of the image f, by performing the graph Fourier transform for each weights' quantization parameters $\Delta_i$ (i=1, 2, ..., Q) by means of the following mathematical expression $$\hat{f}_i = U_i^T f \quad (14)$$

where the graph transform matrix $u_i$ is obtained from the eigenvectors of the graph Laplacian matrix $L_i$, for each weights' quantization parameters $\Delta_i$ (i=1, 2, ..., Q). The Laplacian matrix $L_i$ is computed by means of the following mathematical formula $$L_i = B(\text{diag}(\dot{w}_i^*))B^T \quad (15)$$

wherein the de-quantized and inverse-transformed optimum weights' vector $\{\dot{w}_i\}$ are obtained for each weights' quantization parameters $\Delta_i$ (i=1, 2, ..., Q) by performing the inverse graph Fourier transform on the dual-graph of the de-quantized and transformed optimum weights' vector $\dot{\hat{w}}_i^* = \hat{w}_i^* \Delta_i$, by means of the following expression $$\dot{w}_i^* = U_d \dot{\hat{w}}_{i^*} \quad (16);$$

a coefficients quantization unit 325 configured to quantize for each weights' quantization parameter $\Delta_i$ (i=1, 2, ..., Q) the transformed image's coefficients, given by relation (14), using said coefficients' quantization parameter q, so that $\hat{f}_i^q = \text{round}(\hat{f}_i/q)$.

With also reference to FIG. 3b the graph decoding unit 830 preferably comprises the following (physical or logical) parts:

a coefficients de-quantization unit 330 configured to de-quantize for each weights' quantization parameter $\Delta_i$ (i=1, 2, ..., Q) the quantized and transformed image's coefficients $\hat{f}_i^q$, using said coefficients' quantization parameter q, so that $\dot{\hat{f}}_i = \hat{f}_i^q q$;

an inverse graph transform computation unit 335 configured to compute for each weights' quantization parameter $\Delta_i$ (i=1, 2, ..., Q) the inverse graph Fourier transform of the de-quantized and transformed image's coefficients $\dot{\hat{f}}_i$ by means of the following mathematical expression $$\dot{f}_i = U_i \dot{\hat{f}}_i \quad (17)$$

where the graph transform matrix $U_i$ is obtained as explained in the unit 320.

Figure 3C:
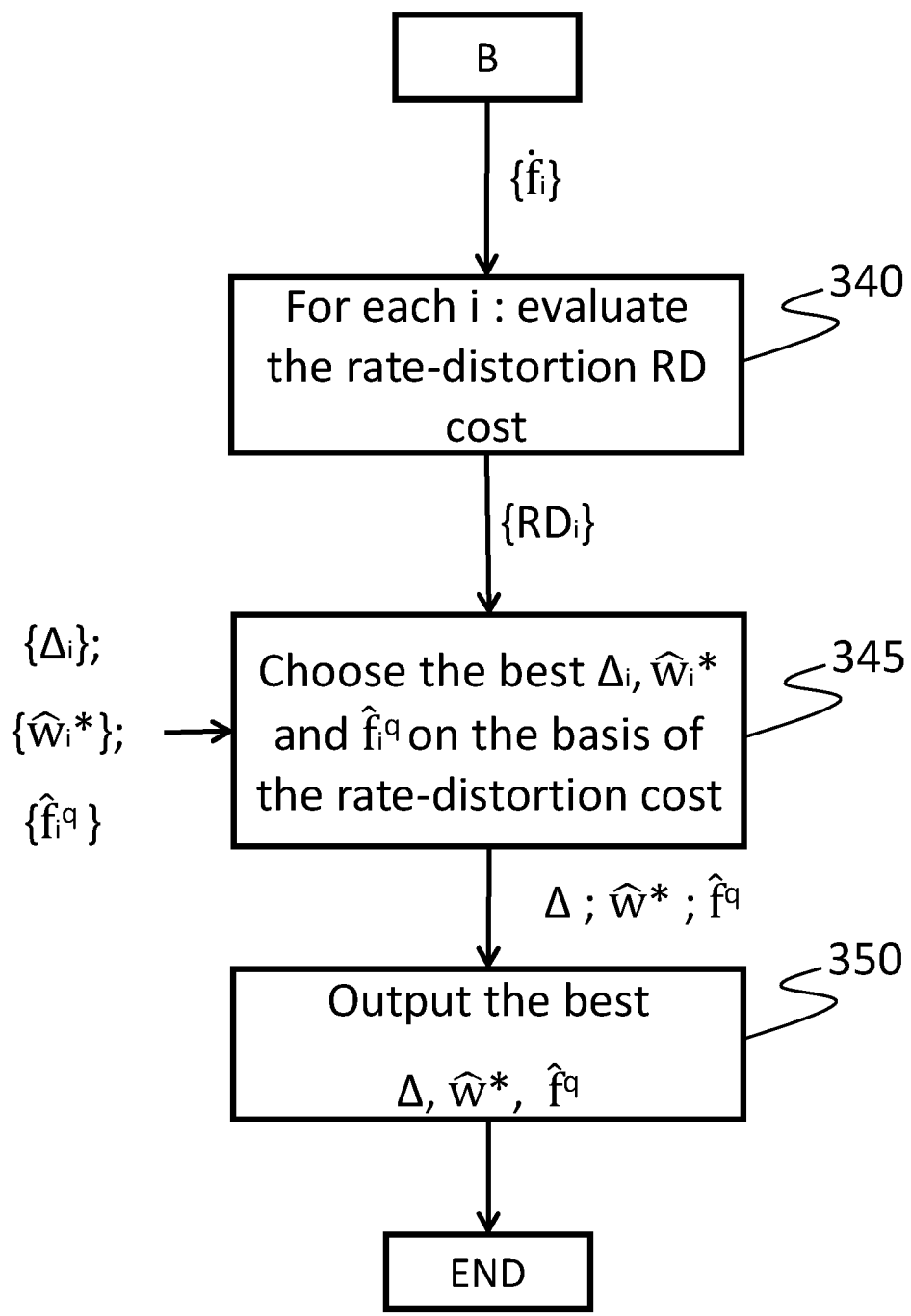

With also reference to FIG. 3c the rate-distortion unit 835 preferably comprises the following (physical or logical) parts:

a rate-distortion computation unit 340 configured to evaluate the rate-distortion cost $RD_i$ for each weights' quantization parameter $\Delta_i$ (i=1, 2, ..., Q), wherein $RD_i$ comprises the rate-distortion cost related to the de-quantized and inverse-transformed image's coefficients given by relation (17), and the rate-distortion related to the de-quantized and inverse-transformed optimum weights $\dot{w}_i^*$ given by relation (16). The rate can be evaluated considering the amount of bits outputted by an entropic encoder which receives $\dot{\hat{f}}_i$ and $\dot{w}_i^*$ as input, whereas the distortion can be evaluated as $\|f-\dot{f}_i\|$ and $\|w^*-\dot{w}_i^*\|$ for the image coefficients and the optimum weights respectively. Where the symbol $$\|v\| = \sqrt{\sum_i |v_i|^2}$$

indicates the 2-norm of a vector (v);

a rate-distortion evaluation unit 345 configured to choose the index i ∈ [1, Q], for which the rate-distortion cost $RD_i$ is minimum;

an outputting unit 350 configured to output the weights' quantization parameters $\Delta_i$, the quantized and transformed optimum weights' vector $\hat{w}_i^*$ and the quantized and transformed image's coefficients $\hat{f}_i^q$, which are selected by the chosen index i.

Summarizing, with also reference to FIG. 8 and FIG. 11, the method for encoding digital images and/or video streams according to the invention comprises the following phases:

an acquisition phase, wherein at least a portion of an image f is acquired from a source 1000 by means of input means (1170);

a graph learning phase, wherein a weights vector w* of a graph related to said at least a portion of the image f is determined, through processing means 1110, by minimizing a cost function that takes into account the cost of transformed coefficients $R_c$ of said graph and the cost of the description $R_G$ of said graph, and considers the weights of said graph as a signal laying on a dual-graph that is an unweighted graph where each node represents an edge of said graph, and two nodes of said dual-graph are connected only if their corresponding edges in the graph share a common endpoint;

a weights vector transformation phase, wherein a transformed weights vector $\hat{w}^*$ is generated, through the processing means 1110, by computing a graph Fourier transform of the weights vector w* laying on said dual-graph;

a weights vector quantization phase, wherein the transformed weights vector $\hat{w}^*$ are quantized according to each element $\Delta_i$ of said set of quantization parameters $\{\Delta_i\}$ by means of the processing means 1110, in order to generate a set of quantized transformed weights vector $\{\hat{w}_i^*\}$;

a transformation phase, wherein transformed coefficients $\hat{f}_i$, $\hat{f}_i$ are computed, by means of the processing means 1110, for each quantized transformed weights $\hat{w}_i^*$ of said set of quantized transformed weights vector $\{\hat{w}_i^*\}$ through a graph Fourier transform of a graph related to said at least a portion of the image (f) and having said quantized transformed weights ($\hat{w}_i^*$) as weights, in order to generate a set of transformed coefficients $\{\hat{f}_i\}$, $\{\hat{f}_i\}$;

a de-quantization phase, wherein each element $\hat{w}_i^*$ of the set of quantized transformed weights vector $\{\hat{w}_i^*\}$ is de-quantized, by means of the processing means 1110, according to the quantization parameter $\Delta_i$ used to quantize it, in order to generate a set of de-quantized transformed weights vector $\{\dot{w}_i^*\}$;

an inverse transformation phase, wherein an inverse graph Fourier transform is computed for each element $\hat{w}_i^*$ of said de-quantized transformed weights vector $\{\dot{w}_i^*\}$, through the processing means 1110, on the basis of said element $\dot{w}_i^*$ and the transformed coefficients $\hat{f}_i$, $\hat{f}_i$ used in the graph Fourier transform, in order to get a set of reconstructed image samples $\{\dot{f}_i\}$;

a distortion computation phase, wherein a distortion cost is computed for each reconstructed image sample of the set of reconstructed image samples $\{\dot{f}_i\}$, through the processing means 1110, on the basis of said reconstructed image sample $\dot{f}_i$ and said at least a portion of the image f;

a selection phase, wherein it is selected, through the processing means 1110, transformed coefficients $\hat{f}$, $\hat{f}^q$, quantized transformed weights $\hat{w}^*$, and a quantization parameter $\Delta$ used for quantizing said transformed quantized transformed weights, associated to the reconstructed image sample $\dot{f}_i$ having the lowest distortion cost;

a transmission phase, wherein the selected elements $\hat{f}$, $\hat{f}^q$, $\hat{w}^*$, $\Delta$ are transmitted and/or stored by means of the output means 1180.

Furthermore, the encoding method may also comprise the following optional phases:

a coefficient quantization phase, wherein each element $\hat{f}_i$ of the set of transformed coefficients $\{\hat{f}_i\}$ is quantized, through the processing means 1110, according to a second quantization parameter q, in order to generate a set of quantized transformed coefficients $\{\hat{f}_i^q\}$;

a coefficient de-quantization phase, wherein each element $\hat{f}_i$ of the set of quantized transform coefficients $\{\hat{f}_i^q\}$ are de-quantized, through the processing means 1110, according to the second quantization parameter q, in order to generate a set of de-quantized transform coefficients $(\{\dot{f}_i\})$.

It evidenced that the transform coefficients used during the inverse transformation phase, the selection phase, and the transmission phase are contained in the set of de-quantized transform coefficients $(\{\dot{f}_i\})$. In this way, it is possible to increase the coding efficiency.

Decoding

Figure 4:
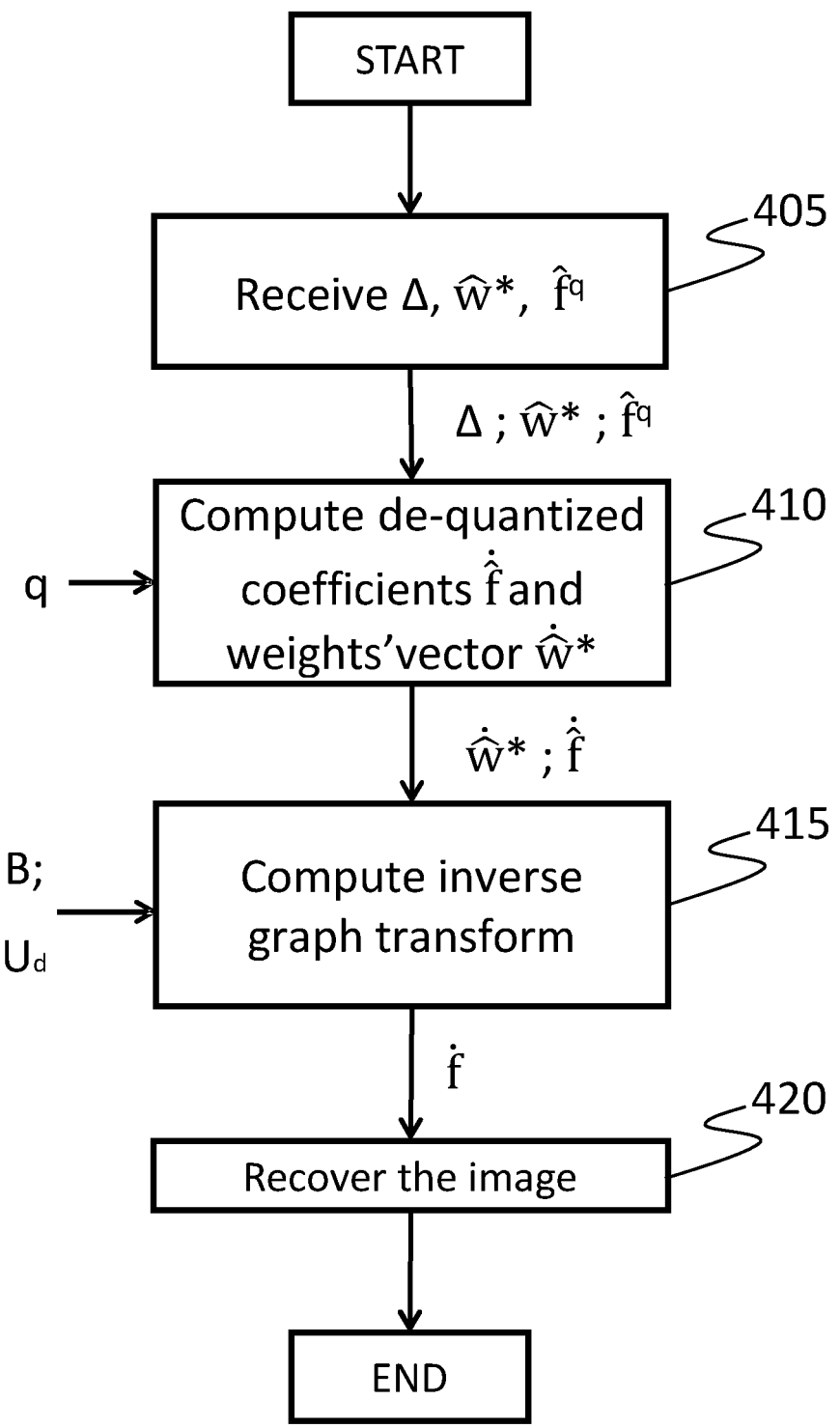
FIG. 4 shows a flowchart depicting the functioning of the apparatus for decoding digital images or video streams according to the present invention.

With reference to FIG. 8 and FIG. 4, the decoder 850 comprises the de-quantization unit 855 and the graph decoding unit 860.

The de-quantization unit 855 preferably comprises the following (physical or logical) parts:

a receiving unit 405 configured to receive the selected weights' quantization parameter $\Delta$, the quantized and transformed optimum weights' vector $\hat{w}^*$ and the quantized and transformed image's coefficients $\hat{f}^q$;

a weights and coefficients de-quantization unit 410 configured to de-quantize the quantized and transformed optimum weights' vector $\hat{w}^*$ and the quantized and transformed image's coefficients vector $\hat{f}^q$, obtaining the de-quantized and transformed optimum, weights' vector $\dot{w}^* = \hat{w}^* \Delta$ and the de-quantized and transformed image's coefficients vector $\dot{f} = \hat{f}^q q$.

Figure 6:
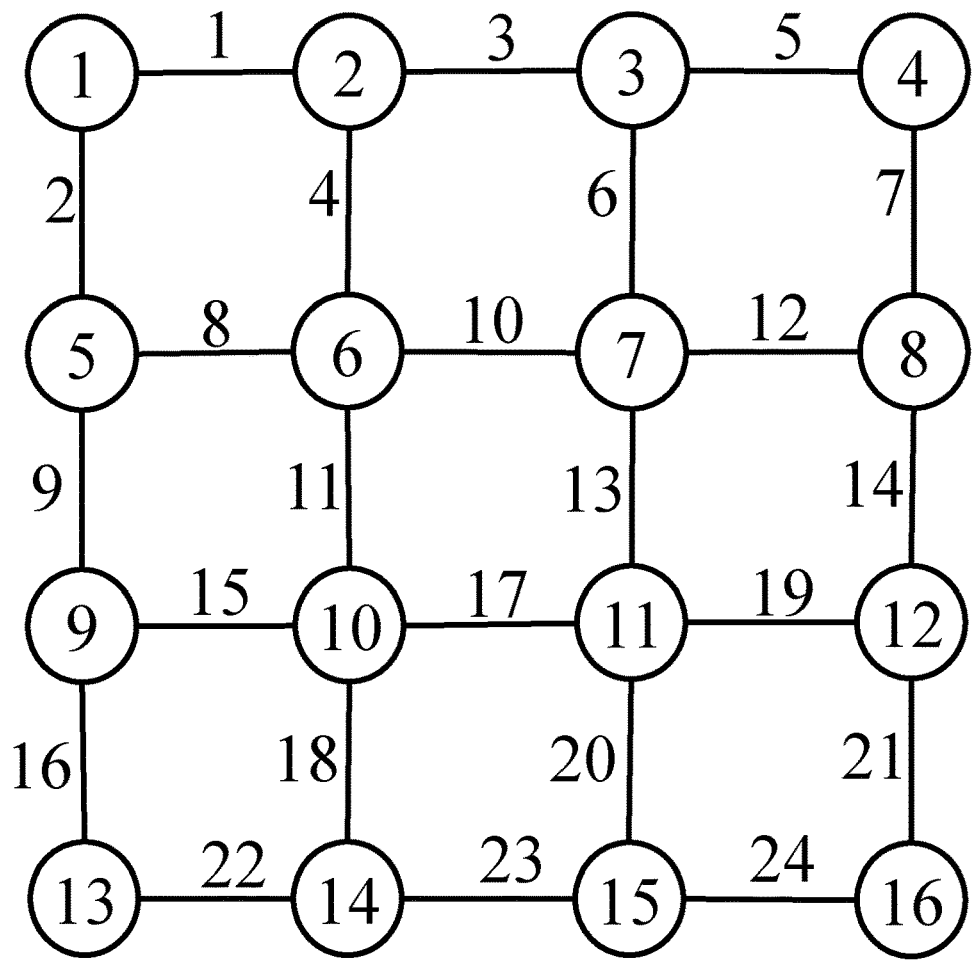
FIG. 6 shows a possible way for vectorising (serializing) an image or an image block represented as a 4-connected square grid graph.
Figure 7:
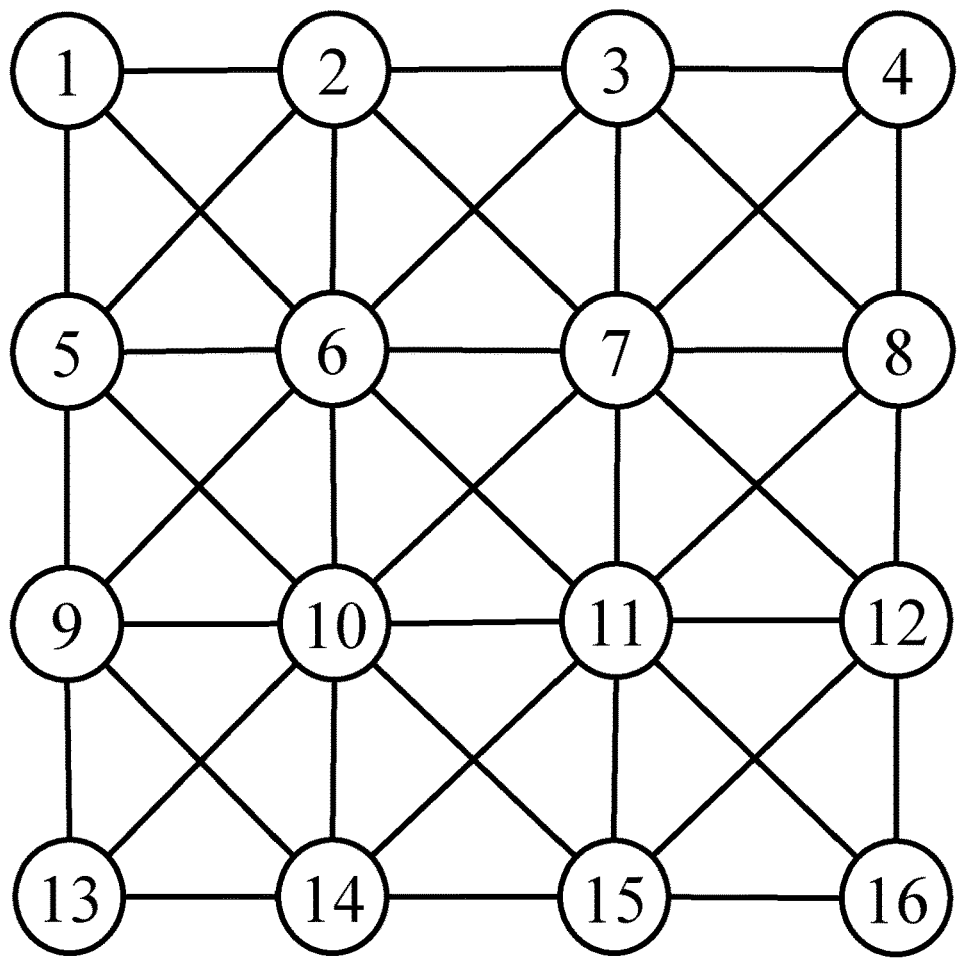
FIG. 7 shows a possible way for vectorising (serializing) an image or an image block represented as a 8-connected square grid graph.

The graph decoding unit 860 preferably comprises the following (physical or logical) parts:

an inverse graph transform computation unit 415 configured to compute the inverse graph Fourier transform of the de-quantized and transformed image's coefficients vector $\dot{f}$ by means of the following mathematical relation $$\dot{f} = U\dot{f} \qquad (18)$$

where the graph transform matrix U is obtained from the eigenvectors of the graph Laplacian matrix L. The Laplacian matrix L is computed by means of the following mathematical formula $$L = B(\text{diag}(\dot{w}^*))B^T \qquad (19)$$

wherein the de-quantized and inverse-transformed optimum weights' vector $\dot{w}^*$ is obtained by performing the inverse graph Fourier transform, on the dual-graph, of the de-quantized and transformed optimum weights' vector $\mathring{w}$, by means of the following expression $$\mathring{w}^* = U_d \dot{\mathring{w}}^* \quad (20);$$

an image recovering unit 420 configured to output the reconstructed image signal vector f and then its conversion to the $\sqrt{N} \times \sqrt{N} = N$ pixel square grid as a bidimensional signal, by reversing the serialization depicted in FIG. 6 or 7, showing an embodiment of the invention.

Summarizing, the method for decoding digital images or video streams according to the invention comprises the following phases:

a reception phase, wherein transformed coefficients $\hat{f}$, $\hat{f}^\gamma$, quantized transformed weights $\hat{w}^*$, and a quantization parameter $\Delta$ are received through the input means 1280;

a de-quantization phase, wherein the quantized transformed weights $\hat{w}^*$ are de-quantized, through the processing means 1210, according to the quantization parameter $\Delta$, in order to generate de-quantized transformed weights $\dot{\hat{w}}^*$;

a weights reconstruction phase, wherein de-quantized reconstructed weights $\dot{w}^*$ are determined, through the processing means 1210, by computing an inverse graph Fourier transform of the quantized transformed weights $\dot{\hat{w}}^*$, which are considered laying on a dual-graph that is an unweighted graph where each node represents an edge of a graph related to the image (f), and two nodes of said dual-graph are connected only if their corresponding edges in the graph share a common endpoint;

an inverse transformation phase, wherein at least a portion of a reconstructed image is generated, through the processing means 1210, by computing an inverse graph Fourier transform on the basis of the de-quantized reconstructed weights ($\dot{w}^*$) and the transformed coefficients $\hat{f}$, $\hat{f}^\gamma$;

an output phase, wherein said at least a portion of said reconstructed image is outputted through the output video means 1270.

Furthermore, the decoding method may also comprise the following optional phase:

a coefficient de-quantization phase, wherein the transformed coefficients $\hat{f}^\gamma$ are de-quantized, through the processing means 1210, according to the second quantization parameter q, in order to generate de-quantized transformed coefficients $\dot{\hat{f}}$.

In combination with this additional phase and during the inverse transformation phase, said at least a portion of said reconstructed image is generated, through the processing means 1210, by computing an inverse graph Fourier transform on the basis of the de-quantized transformed weights ($\dot{\hat{w}}^*$) and the de-quantized transformed coefficients ($\dot{\hat{f}}$). In this way, it is possible to increase the coding/decoding efficiency.

Optionally the graph decoding unit can read from the input bitstream, for example in form of a metadatum the value of $\tilde{M}$ or of the difference $M-\tilde{M}$ which signalizes the number of elements contained the quantized and transformed optimum weights' vector $\hat{w}^*$. In other words, the processing means 1210 are also configured for receiving, through the input means 1280, a size value representing the original size of the quantized transformed weights $\hat{w}^*$, and increasing the size of the quantized transformed weights $\hat{w}^*$ by adding null values (e.g., zero values or values representing empty components), before determining the de-quantized reconstructed weights $\dot{w}^*$. In this way, it is possible to increase the coding/decoding efficiency.

Finally, in an embodiment of the invention the reconstructed bidimensional image can be reconstructed by means of a vector-to-matrix conversion of the vector f and then outputted by means of output video means 1270.

Performance Tests

Figure 13:
FIG. 13 shows the block decomposition of an image given on the basis of the three classes defined in the context of performance test.
Figure 13:
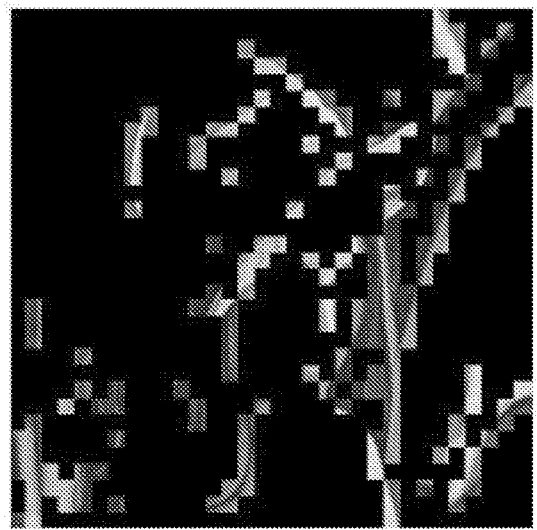
Figure 13:
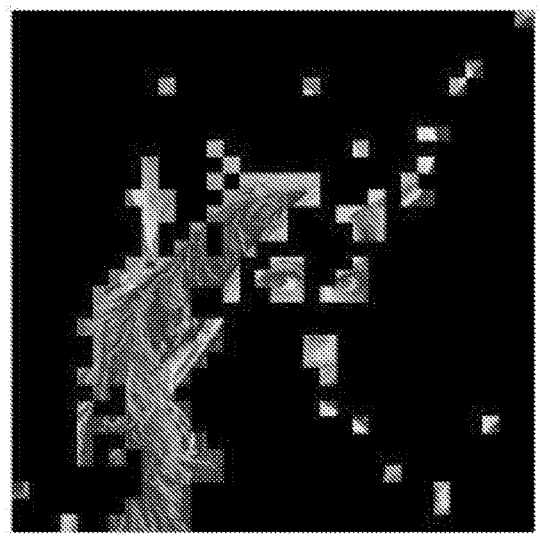
Figure 14:
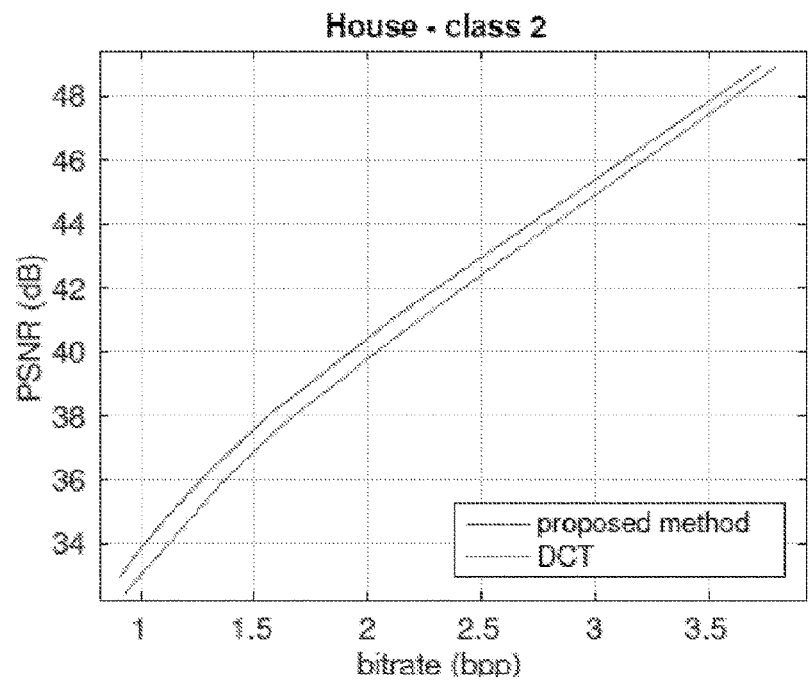
FIG. 14 shows the performance of a test encoder-decoder pair implemented according to the present invention.
Figure 14:
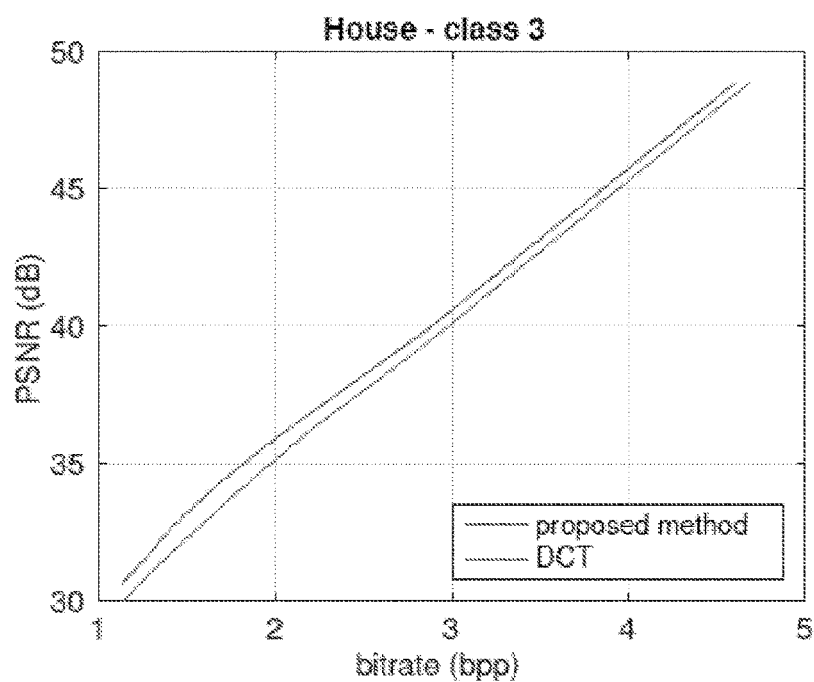

With reference to FIG. 13 and FIG. 14, the results of performance tests conducted by the Applicant are going to be discussed. In this test, an encoder-decoder pair implemented according to the present invention has been evaluated.

In order to perform the coding-encoding test, four standard grayscale images (Lena, Boat, Peppers and House) were considered, these images were split into non-overlapping 16×16 pixel blocks. The chosen topology of the graph is a 4-connected grid which gives M=480 edges, whereas was set in all experiments $\tilde{M}$=64 and Q=8. The value of the parameters $\alpha$ and $\beta$ of the graph learning problem given by relation (9) depends on the characteristics of the block. For this reason, a block's structure complexity classification using the structure tensor analysis (I. Rotondo, G. Cheung, A. Ortega, and H. E. Egilmez, "Designing sparse graphs via structure tensor for block transform coding of images", published in APSIPA2015), was performed. Three classes of block's structure complexity were defined, for each class a different value of the parameter $\alpha$ was set, while for each class was chosen $\beta$=1. FIG. 13 shows for example the block decomposition of the Lena image given on the basis of the three defined classes. In particular, FIG. 13(a), FIG. 13(b) and FIG. 13(c), show the block decomposition corresponding to the class 1, 2 and 3 respectively.

Figure 15:
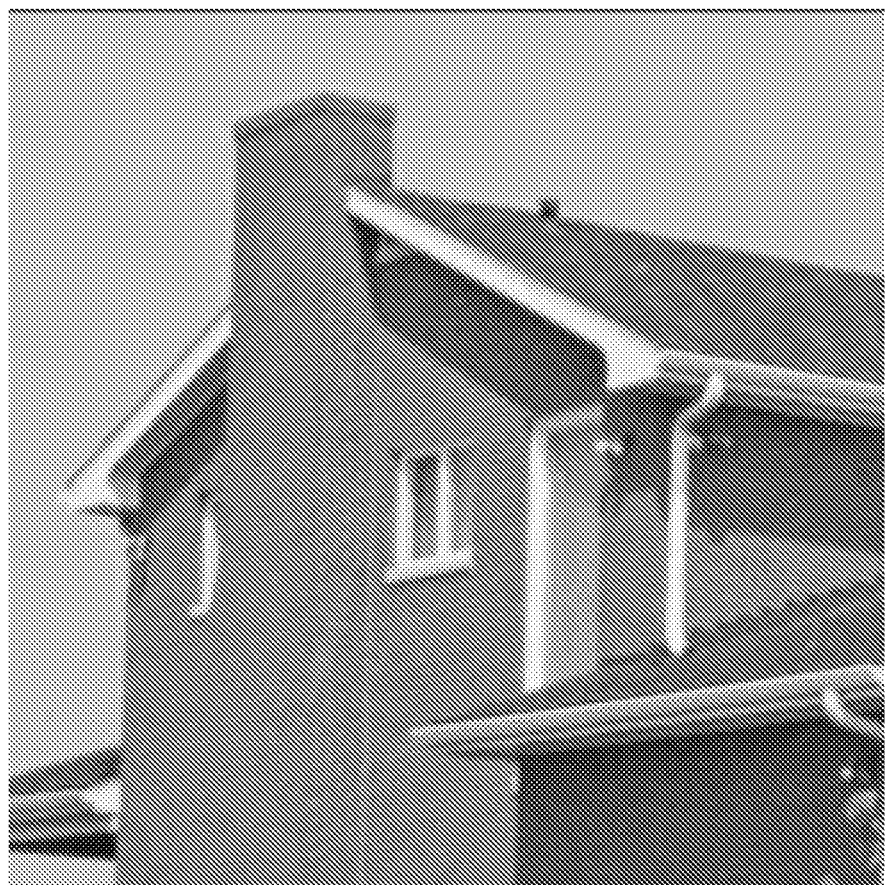
FIG. 15 shows a test image employed to perform the encoder-decoder test according to the present invention.

The performances of the method described in the present invention were compared respect to the performances of the classical DCT transform. For each class, the mean rate-distortion cost was evaluated averaging the rate-distortion cost for each block of a given class for all images. Successively, the Bjontegaard metric (G. Bjontegaard, "Calculation of average PSNR differences between RD curves," Doc. VCEG-M33 ITU-T Q6/16, Austin, Tex., USA, 2-4 April 2001) was considered in order to compute the average gain in PSNR compared to the DCT. In particular, the method described in the present invention outperforms DCT providing an average PSNR gain of 0.6 dB for blocks in the second class and 0.64 dB for blocks in the third class. FIG. 14 shows for example the performance of the second (FIG. 14(a)) and third (FIG. 14(b)) classes only referred to the House image (FIG. 15). It is interesting to point out that there is not a significant difference in performance between the second class and the third one. Instead, in the first class the gain is nearly 0, as DCT in this case is already optimal.

Concluding, the obtained results show that the method described in the present invention can outperform classical fixed transforms as DCT.

Other Embodiments and Generalizations

In a second embodiment of the present invention, the image to be coded may be preliminarily filtered so to remove high frequency components. Examples of appropriate filters include Gaussian or an anisotropic filter. In other words, the processing means 1110 may be also configured for filtering at least a portion of the image f to be encoded, in order to remove at least a frequency component having its frequency (value) higher than a threshold. In this way, it is possible to increase the coding efficiency, especially when high frequency components are not required in the encoding, e.g., when they are associated to noise produced by image sensors or the like.

In a third embodiment, the invention can be adapted so as to be used for compressing also color images. In case of an RGB image, for example, the invention can be used to compress at least one of the R, G, or B components; since the components are in general strongly correlated it is possible to infer or predict the other components basing on those of the starting one. In other words, the processing means 1210,1220 of the decoding apparatus 1200 may be also configured for generating at least another component of said RGB image on the basis of at least a portion of the reconstructed image. In this way, it is possible to increase further the coding efficiency.

Analogously, in case of a YUV coded color image, the luminance component Y can be compressed according to the invention, while the chroma components U and V can be compressed and decompressed in a similar way as their difference signal from Y (Y-U and Y-V), with some adaptations taking into account the different statistical features of the chroma components with respect to luminance. In other words, at least a portion of the image to be encoded and at least a portion of the reconstructed image may be a luminance component or a difference between the luminance component and a chroma component of a YUV coded colour image. In this way, it is possible to increase further the coding efficiency.

In a fourth embodiment, the invention is integrated in a video coding technique wherein also the temporal correlation between different images is taken into account. To that end, a prediction mechanism similar to those used in the conventional video compression standards can be used in combination with the invention for effectively compressing and decompressing a video signal.

The terms image and image block used in the present description as input bi-dimensional signal must be interpreted in their broadest meaning. They can encompass pixel values directly derived or extracted from a natural image, an artificial image, the prediction error of an image, a sub-sampled version of an image at higher resolution, any portion of said kind of images, or the like.

In the preferred embodiment, the optimum weights' vector of the graph related to an image or video data, is computed by solving the learning problem given by relation (9). In any embodiments, any other definitions of the learning problem, which takes in the account the cost of the transform coefficients $R_c$ and the cost of the graph description $R_G$ of the image f (or a block thereof), can be used in order to evaluate said optimum weights' vector without departing from the teaching of the present invention.

The vectorising process described for deriving a mono-dimensional vector representation of an image or a portion thereof is merely optional and non-essential for implementing the present invention. It simply allows a compacter representation of the image input data and a simpler data structure and processing of the distances and weights matrixes. Other kind of representations and data structures can be used for the input image or its blocks and, conversely, for the distance and weight matrixes as well, whose structures, in general depend on those of the input image data.

The dimensions of the image blocks mentioned in describing an embodiment of the invention are exemplificative. In other embodiments they can be of any size, form a rectangle or a square, be homogeneous for the entire image or adaptive to the local features of the image. For example the image blocks can be smaller for image areas having more complex edges and larger for those areas having few or no edges.

In another embodiment, the image may be preliminarily subdivided in smaller blocks preferably composed each of the same number of N pixels, which are then independently encoded and decoded according to the present invention. If necessary stuffing (padding) pixel can be added in order to have the encoder and decoder operating on blocks of the same (predetermined) size. This added pixel can be removed by the decoding device after having reconstructed the image f.

In another embodiment, the image may be preliminarily subdivided in non-overlapping blocks preferably composed each of the same number of N pixels, which are then independently encoded and decoded according to the present invention or using other encoding/decoding techniques e.g., DCT, on the basis of some criteria such as the block structure complexity or rate-distortion cost, etc.

In another embodiment, the weights' quantization parameter Δ, the quantized and transformed optimum weights' vector ŵ* and the quantized and transformed image's coefficients of the vector $f^\gamma$ are further compressed with existing entropy coding techniques prior to their transmission on the channel with the goal to further reduce the bandwidth required for their representation and are decompressed at the receiver prior they are processed by the decoding units. In other words, the processing means 1110 may be also configured for compressing the selected transformed coefficients, the selected quantized transformed weights, and the selected quantization parameter by means of an entropy encoding algorithm, before transmitting them (the selected elements) through the output means 1180.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for encoding digital images and/or video streams, said apparatus comprising:
   a memory;
   a central processing unit configured to:
   facilitate acquiring at least a portion of an image (f) from a source,
   facilitate transmitting at least a portion of an encoded image to a destination, and
   read at least a portion of said image (f),
   wherein the memory includes at least a set of quantization parameters ({$\Delta_i$}), and wherein the central processing unit is further configured to:
   determine a weights vector (w*) of a graph related to said at least the portion of the image (f) by minimizing a cost function that takes into account a cost of transformed coefficients ($R_c$) of said graph and a cost of a description ($R_G$) of said graph, wherein said description cost ($R_G$) depends on a graph Fourier transform of weights of said graph as a signal laying on a dual-graph that is an unweighted graph where each node represents an edge of said graph, and two nodes of said dual-graph are connected only if their corresponding edges in the graph share a common endpoint, generate a transformed weights vector ($\hat{w}^*$) by computing a graph Fourier transform of the weights vector ($w^*$) laying on said dual-graph, quantize the transformed weights vector ($\hat{w}^*$) according to each element ($\Delta_i$) of said set of quantization parameters ($\{\Delta_i\}$), in order to generate a set of quantized transformed weights vector ($\{\hat{w}_i^*\}$), compute, for each quantized transformed weights ($\hat{w}_i^*$) of said set of quantized transformed weights vector ($\{\hat{w}_i^*\}$), transformed coefficients ($\hat{f}_i$, $\hat{f}_i$) through a graph Fourier transform of a graph related to said at least a portion of the image (f), wherein said graph has said quantized transformed weights ($\hat{w}_i^*$) as weights, in order to generate a set of transformed coefficients ($\{\hat{f}_i\}$, $\{\hat{f}_i\}$), de-quantize each element ($\hat{w}_i^*$) of the set of quantized transformed weights vector ($\{\hat{w}_i^*\}$)) according to the quantization parameter ($\Delta_i$) used to quantize it, in order to generate a set of de-quantized transformed weights vector ($\{\dot{w}_i^*\}$), compute, for each element ($\dot{w}_i^*$) of said de-quantized transformed weights vector ($\{\dot{w}_i^*\}$), an inverse graph Fourier transform on a basis of said element ($\dot{w}_i^*$) and the transformed coefficients ($\hat{f}_i$, $\hat{f}_i$) used in the graph Fourier transform, in order to get a set of reconstructed image samples ($\{\dot{f}_i\}$), compute, for each reconstructed image sample ($\dot{f}_i$) of the set of reconstructed image samples ($\{\dot{f}_i\}$), a distortion cost on a basis of said reconstructed image sample ($\dot{f}_i$) and said at least a portion of the image (f), select transformed coefficients ($\hat{f}$, $\hat{f}^q$), quantized transformed weights ($\hat{w}^*$), and a quantization parameter ($\Delta$) used for quantizing said transformed quantized transformed weights, associated to the reconstructed image sample ($\dot{f}_i$) having the lowest distortion cost, and transmitting and/or storing them ($\hat{f}$, $\hat{f}^q$, $\hat{w}^*$, $\Delta$).

2. The encoding apparatus according to claim 1, wherein the central processing unit is further configured to:

quantize each element ($\hat{f}_i$) of the set of transformed coefficients ($\{\hat{f}_i\}$) according to a second quantization parameter (q), in order to generate a set of quantized transformed coefficients ($\{\hat{f}_i^q\}$), de-quantize each element ($\hat{f}_i^q$) of the set of quantized transform coefficients ($\{\hat{f}_i^q\}$) according to the second quantization parameter (q), in order to generate a set of de-quantized transform coefficients ($\{\dot{f}_i\}$), wherein the transform coefficients used for computing the inverse graph Fourier transform, selected on the basis of the distortion cost, and transmitted are contained in the set of de-quantized transform coefficients ($\{\dot{f}\}$).

3. The encoding apparatus according to claim 1, wherein the central processing unit is further configured to:

filter said at least a portion of the image (f), in order to remove at least a frequency component having its frequency higher than a threshold.

4. The encoding apparatus according to claim 1, wherein the central processing unit is further configured to:

reduce the size of the weights vector ($w^*$) by truncating it at the first $\tilde{M}<M$ elements, wherein M is the edge number of the graph related to said at least a portion of the image, and transmit the original size of said weights vector ($w^*$).

5. The encoding apparatus according to claim 1, wherein said at least the portion of the image (f) is a component of an RGB image.

6. The encoding apparatus according to claim 1, wherein said at least the portion of the image (f) is a luminance component or a difference between the luminance component and a chroma component of a YUV coded color image.

7. The encoding apparatus according to claim 1, wherein the central processing unit is further configured to:

compress the selected transformed coefficients ($\hat{f}$, $\hat{f}^q$), the selected quantized transformed weights ($\hat{w}^*$), and the selected quantization parameter ($\Delta$) using an entropy encoding algorithm, before transmitting them ($\hat{f}$, $\hat{f}^q$, $\hat{w}^*$, $\Delta$).

8. An apparatus for decoding digital images and/or video streams, said apparatus comprising:

a memory;

a central processing unit configured to:

facilitate acquiring at least a compressed portion of an image (f) from a communication channel or a storage media, facilitate outputting at least a portion of a reconstructed image, receive transformed coefficients ($\hat{f}$, $\hat{f}^q$), quantized transformed weights ($\hat{w}^*$), and at least a quantization parameter ($\Delta$) related to said transformed weights, de-quantize the quantized transformed weights ($\hat{w}^*$) according to said at least the quantization parameter ($\Delta$), in order to generate de-quantized transformed weights ($\dot{w}^*$), determine de-quantized reconstructed weights ($\dot{w}^*$) by computing an inverse graph Fourier transform of the de-quantized transformed weights ($\dot{w}^*$), which are considered laying on a dual-graph that is an unweighted graph where each node represents an edge of a graph related to the image (f), and two nodes of said dual-graph are connected only if their corresponding edges in the graph share a common endpoint, generate said at least a portion of said reconstructed image by computing an inverse graph Fourier transform on a basis of the de-quantized reconstructed weights ($\dot{w}^*$) and the transformed coefficients ($\hat{f}$, $\hat{f}^q$), output said at least the portion of said reconstructed image.

9. The decoding apparatus according to claim 8, wherein the received transformed coefficients ($\hat{f}^q$) are quantized according to at least a second quantization parameter (q), and wherein the central processing unit is further configured to:

de-quantize the transformed coefficients ($\hat{f}^q$) according to said at least the second quantization parameter (q), in order to generate de-quantized transformed coefficients ($\dot{f}$), generate said at least the portion of said reconstructed image by computing an inverse graph Fourier transform on a basis of the de-quantized transformed weights ($\dot{w}^*$) and the de-quantized transformed coefficients ($\dot{f}$).

10. The decoding apparatus according to claim 8, wherein the central processing unit is further configured to:

receive a size value representing the original size of the quantized transformed weights ($\hat{w}^*$), increase the size of the quantized transformed weights ($\hat{w}^*$) by adding null values, before determining the de-quantized reconstructed weights ($\dot{w}^*$).

11. The decoding apparatus according to claim 8, wherein said at least the portion of said reconstructed image is a component of an RGB image, and wherein the central processing unit is further configured for to:
  generate at least another component of said RGB image on a basis of said at least the portion of said reconstructed image.

12. The decoding apparatus according to claim 8, wherein said at least the portion of the reconstructed image is a luminance component or a difference between the luminance component and a chroma component of a YUV coded colour image.

13. The decoding apparatus according to claim 8, wherein the central processing unit is further configured to:
  decompress the received transformed coefficients ($\hat{f}$, $\hat{f}^q$), the received quantized transformed weights ($\hat{w}^*$), and the received quantization parameter ($\Delta$) using an entropy encoding algorithm, before de-quantizing them ($\hat{f}$, $\hat{f}^q$, $\hat{w}^*$, $\Delta$).

14. A method for encoding digital images and/or video streams, said method comprising:
  an acquisition phase, wherein at least a portion of an image (f) is acquired from a source,
  a graph learning phase, wherein a weights vector (w*) of a graph related to said at least a portion of the image (f) is determined, through use of a central processing unit, by minimizing a cost function that takes into account the cost of transformed coefficients ($R_c$) of said graph and the cost of the description ($R_G$) of said graph, and wherein said description cost ($R_G$) depends on a graph Fourier transform of the weights of said graph as a signal laying on a dual-graph that is an unweighted graph where each node represents an edge of said graph, and two nodes of said dual-graph are connected only if their corresponding edges in the graph share a common endpoint,
  a weights vector transformation phase, wherein a transformed weights vector ($\hat{w}^*$) is generated, through the central processing unit, by computing a graph Fourier transform of the weights vector (w*) laying on said dual-graph,
  a weights vector quantization phase, wherein the transformed weights vector ($\hat{w}^*$) are quantized according to each element ($\Delta_i$) of said set of quantization parameters ($\{\Delta_i\}$) using the central processing unit, in order to generate a set of quantized transformed weights vector ($\{\hat{w}_i^*\}$),
  a transformation phase, wherein transformed coefficients ($\hat{f}$, $\hat{f}_i$) are computed, by the central processing unit, for each quantized transformed weights ($\hat{w}_i^*$) of said set of quantized transformed weights vector ($\{\hat{w}_i^*\}$) through a graph Fourier transform of a graph related to said at least a portion of the image (f) and having said quantized transformed weights ($\hat{w}_i^*$) as weights, in order to generate a set of transformed coefficients ($\{\hat{f}\}, \{\hat{f}_i\}$),
  a de-quantization phase, wherein each element ($\hat{w}_i^*$) of the set of quantized transformed weights vector ($\{\hat{w}_i^*\}$) is de-quantized, by the central processing unit, according to the quantization parameter ($\Delta_i$) used to quantize it, in order to generate a set of de-quantized transformed weights vector ($\{\dot{w}_i^*\}$),
  an inverse transformation phase, wherein an inverse graph Fourier transform is computed for each element ($\dot{w}_i^*$) of said de-quantized transformed weights vector ($\{\dot{w}_i^*\}$), through the central processing unit, on the basis of said element ($\dot{w}_i^*$) and the transformed coefficients ($\hat{f}_i$, $\hat{f}_i$) used in the graph Fourier transform, in order to get a set of reconstructed image samples ($\{\dot{f}_i\}$),
  a distortion computation phase, wherein a distortion cost is computed for each reconstructed image sample ($\dot{f}_i$) of the set of reconstructed image samples ($\{\dot{f}_i\}$), through the central processing unit, on the basis of said reconstructed image sample ($\dot{f}_i$) and said at least a portion of the image (f),
  a selection phase, wherein it is selected, through the central processing unit, transformed coefficients ($\hat{f}$, $\hat{f}^q$), quantized transformed weights ($\hat{w}^*$), and at least a quantization parameter ($\Delta$) used for quantizing said transformed quantized transformed weights, associated to the reconstructed image sample ($\dot{f}_i$) having the lowest distortion cost, and
  a transmission phase, wherein the selected elements ($\hat{f}$, $\hat{f}^q$, $\hat{w}^*$, $\Delta$) are transmitted and/or stored.

15. The encoding method according to claim 14, further comprising:
  a coefficient quantization phase, wherein each element ($\hat{f}_i$) of the set of transformed coefficients ($\{\hat{f}_i\}$) is quantized, through the central processing unit, according to a second quantization parameter (q), in order to generate a set of quantized transformed coefficients ($\{\hat{f}_i^q\}$), and
  a coefficient de-quantization phase, wherein each element ($\hat{f}_i^q$) of the set of quantized transform coefficients ($\{\hat{f}_i^q\}$) are de-quantized, through the central processing unit, according to the second quantization parameter (q), in order to generate a set of de-quantized transform coefficients ($\{\hat{f}_i\}$),
  wherein the transform coefficients used during the inverse transformation phase, the selection phase, and the transmission phase are contained in the set of de-quantized transform coefficients ($\{\hat{f}_i\}$).

16. A method for decoding digital images and/or video streams, said method comprising:
  a reception phase, wherein transformed coefficients ($\hat{f}$, $\hat{f}^q$), quantized transformed weights ($\hat{w}^*$), and a quantization parameter ($\Delta$) are received,
  a de-quantization phase, wherein the quantized transformed weights ($\hat{w}^*$) are de-quantized using a central processing unit, according to the quantization parameter ($\Delta$), in order to generate de-quantized transformed weights ($\dot{w}^*$),
  a weights reconstruction phase, wherein de-quantized reconstructed weights ($\dot{w}^*$) are determined, through the central processing unit, by computing an inverse graph Fourier transform of the de-quantized transformed weights ($\dot{w}^*$), which are considered laying on a dual-graph that is an unweighted graph where each node represents an edge of a graph related to the image (f), and two nodes of said dual-graph are connected only if their corresponding edges in the graph share a common endpoint,
  an inverse transformation phase, wherein at least a portion of a reconstructed image is generated, through the central processing unit, by computing an inverse graph Fourier transform on the basis of the de-quantized reconstructed weights ($\dot{w}^*$) and the transformed coefficients ($\hat{f}$, $\hat{f}^q$),
  an output phase, wherein said at least a portion of said reconstructed image is outputted.

17. The decoding method according to claim 16, wherein the transformed coefficients ($\hat{f}^q$) received during the reception phase are quantized according to a second quantization parameter (q), wherein said method also comprises:
- a coefficient de-quantization phase, wherein the transformed coefficients ($\hat{f}^\gamma$) are de-quantized, through the central processing unit, according to the second quantization parameter (q), in order to generate de-quantized transformed coefficients ($\hat{f}$), and
- wherein during the inverse transformation phase said at least a portion of said reconstructed image is generated, through the central processing unit, by computing an inverse graph Fourier transform on the basis of the de-quantized transformed weights ($\hat{w}^*$) and the de-quantized transformed coefficients ($\hat{f}$).

18. A hardware storage device comprising instructions that are executable to perform the method according to claim 14.

\* \* \* \* \*